(12) United States Patent
Beckford et al.

(10) Patent No.: US 9,747,288 B1
(45) Date of Patent: Aug. 29, 2017

(54) SCALABLE TRANSACTION-BASED DATA REPOSITORY SERVICE

(71) Applicant: Amazon Technologies, Inc., Reno, NV (US)

(72) Inventors: Nathaniel Jonah Beckford, Bothell, WA (US); Seung Hyok Choi, Seattle, WA (US); John Kenneth White, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 776 days.

(21) Appl. No.: 13/710,236

(22) Filed: Dec. 10, 2012

(51) Int. Cl.
*G06F 7/00* (2006.01)
*G06F 17/30* (2006.01)

(52) U.S. Cl.
CPC .............................. *G06F 17/30008* (2013.01)

(58) Field of Classification Search
CPC ......... G06F 17/30171; G06F 17/30362; G06F 17/30371; G06F 17/30073
USPC .......................... 707/703, 704, 999.008, 687
See application file for complete search history.

(56) References Cited

U.S. PATENT DOCUMENTS

| | | | | |
|---|---|---|---|---|
| 5,897,634 | A * | 4/1999 | Attaluri | G06F 17/30607 |
| 2005/0289198 | A1 * | 12/2005 | Todd | G06F 17/30578 |
| 2008/0319878 | A1 * | 12/2008 | Glebe | G06Q 10/00 705/28 |
| 2011/0196838 | A1 * | 8/2011 | Zunger | G06F 17/30194 707/636 |
| 2011/0246434 | A1 * | 10/2011 | Cheenath | G06F 17/3038 707/703 |
| 2012/0023369 | A1 * | 1/2012 | Bourbonnais | G06F 11/1474 714/16 |
| 2013/0179244 | A1 * | 7/2013 | Laffoon | H04L 63/0823 705/14.23 |

* cited by examiner

*Primary Examiner* — Md. I Uddin
(74) *Attorney, Agent, or Firm* — Kilpatrick Townsend & Stockton LLP

(57) ABSTRACT

A reliable and scalable data repository service can be supporting cooperative transactions. In an example, multiple data producers may use the data repository service to upload data in one or more transactions. Data contained in one transaction may be treated as an atomic unit. In an embodiment, the data repository service manages multiple candidate transactions associated with an election transaction such that at most one candidate transaction may begin and/or commit a given time. During a commit of a candidate transaction, the data uploaded during the candidate transaction may become associated with the election transaction. The data repository service may maintain metadata associated with each of the candidate transactions. In response to a request for data associated with the election transaction, the metadata may be used, in conjunction with a user-specified isolation level, to locate the data uploaded some of the candidate transactions for the election transaction.

20 Claims, 19 Drawing Sheets

SCALABLE TRANSACTION-BASED DATA REPOSITORY SERVICE

BACKGROUND

Data analytics, such as web analytics, often require large amount of data to be uploaded to a data warehouse where the data may be durably accessed for subsequent analysis. Often times, portions of such may need to be uploaded frequently (e.g., on a daily basis) and reliability (e.g., no data loss or duplicate data). One approach to guarantee reliability is to acquire an exclusive lock for the duration of an upload and release the lock only after the upload is complete. However, when the upload is long-running, the risk of lock contention increases. Lock contention occurs when one process attempts to acquire a lock held by another process. In addition, this approach typically does not scale when multiple servers or processes are configured perform the same work (e.g., uploading data for the same dataset or a portion thereof) to provide performance benefits such as increased throughput, reduced response time, fault tolerance and the like.

BRIEF DESCRIPTION OF THE DRAWINGS

Various embodiments in accordance with the present disclosure will be described with reference to the drawings, in which.

DETAILED DESCRIPTION

Figure 1:
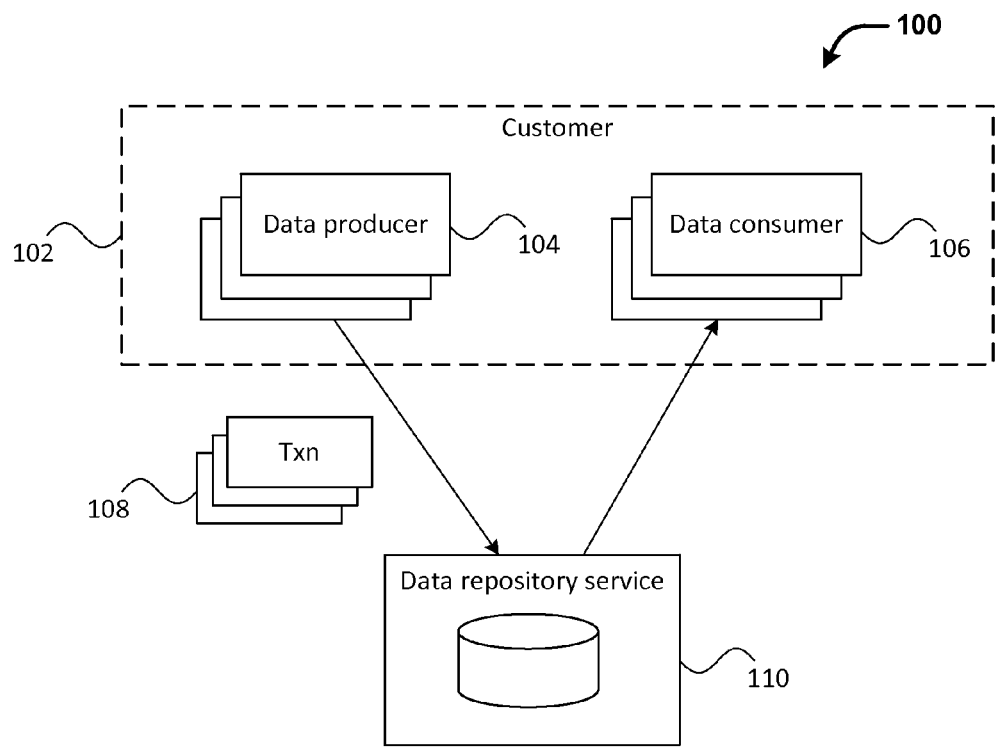
FIG. 1 illustrates an example environment for implementing a data repository service, in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein include methods that can be used for providing a reliable and scalable data repository service that allows data producers to upload data which may be used by data consumers. In some embodiments, the data repository service may provide reliability guarantees similar to the ACID (atomicity, consistency, isolation, durability) attributes traditionally associated with relational database transactions. With regard to atomicity, the data repository service may provide a data producer the ability to upload a dataset in an atomic transaction. While the dataset may be uploaded to the data repository service in one or more batches, the dataset is treated as an atomic unit such that from a data consumer's point of view, the dataset appears "all-or-nothing." With respect to consistency, the data repository service may provide assurance that any data uploaded to the data repository service are valid according to a set of predefined rules such that the data visible to queries are always in a consistent state. With respect to isolation, the data repository service may control the visibility of data sets associated with concurrently running transactions so that data associate with each of the transactions are not visible to each other until the completion of the transactions. Further, the data repository service may support different isolation levels which may be specified in connection with a query. With respect to durability, data uploaded and/or committed to the data repository service may be stored in a durable fashion.

In addition to the ACID-like guarantees discussed above, the data repository service may reduce the risk of lock contention and allow the number of data producers to scale. The risk of lock contention is reduced, in an embodiment, by acquiring locks only at the start and end of a transaction. Furthermore, access to the lock of a transaction may be shared across many data producers so the data producers can scale. For example, in an embodiment, multiple data producers (e.g., processes) may be allowed to perform individual and potentially parallel transactions for the same transaction. However, in an embodiment, only one of the multiple data producers may be allowed to commit the transaction, such that data associated with the committed transaction becomes available. Various methods may be used to determine which of the data producer gets to commit. For example, the determination may be made on a first-come-first-serve basis and/or priorities assigned to the data producers. During the execution of a transaction, one or more batches of data may be uploaded to the data repository service. In an embodiment, batches of data associated with each of the multiple transactions are stored in different locations. In an embodiment, the data repository service maintains metadata associated with each batch of the actual data being uploaded in a transaction. Such metadata may include the location of the uploaded batch, transaction identifier, state of the batch (e.g., pending, committed) and the like. During begin and/or commit of a transaction, metadata associated with the uploaded batches for the transaction may be updated to ensure consistency.

In an embodiment, the data repository service also provides an interface for a data consumer to query the data uploaded by data producers. A data consumer may specify an isolation level associated with the query. The isolation level may be used, in connection with the metadata, to determine what data to provide in response to the query and where to retrieve the data.

FIG. 1 illustrates an example environment 100 for implementing a data repository service, in accordance with at least one embodiment. In this example, one or more customers 102 may be operably connected to a data repository service 110. Unless otherwise clear from context, the term "customer" refers to the system(s) of a customer entity (such as an individual, company, or other organization) that utilizes data repository service described herein. Such systems may include datacenters, mainframes, individual computing devices, distributed computing environments and customer-accessible instances thereof, or any other system capable of communicating with the data storage system. In some embodiments, a customer may refer to a machine instance (e.g., with direct hardware access) or virtual instance of a distributed computing system provided by a computing resource provider that also provides the data repository service. A customer may include one or more data producers 104, one or more data customers 106 or a combination of both.

A data producer 104 may include one or more components of a customer 102 that produce data which is uploaded or otherwise imported into the data repository service 110. In some embodiments, a data producer 104 may receive input data from a data source (such as a user or process), perform some computation and/or processing based on the input data and produces output data to be stored in the data repository service. For example, data producers 104 may include Hadoop nodes that collectively perform distributed computing and computers engaged in parallel computing using protocols such as Message Passing Interface (MPI). A data consumer 106 may include one or more components of a customer 102 that retrieves data stored in the data repository service 110 for reporting, analysis, aggregation or other purposes. For example, a data consumer 106 may include part of an Online Analytics Processing ("OLAP") system, an Online Transaction Process ("OLTP") system, a data analytics application (e.g., Microsoft Excel), a web browser or the like. In some embodiments, a data producer 104 may also be a data consumer 106.

As a concrete example, a data producer 104 may be configured to collect, process and/or analyze traffic or usage data related to a web site to produce website metrics data. The website metric data may include hit records that include information related to one or more hits (i.e., requests) to the website. In this case, one or more data producers 104, such as a collection of Hadoop nodes, may each be configured to calculate session information for a set of hit records and to update the hit records with the calculated session information. The updated hit records may be uploaded to the data repository service 110 and used by data consumers 106 such as web analytics tools for business and/or marketing analysis and reporting.

In some embodiments, the data repository service 110 may allow data producers 104 to upload data in one or more transactions 108. The dataset enclosed by a transaction may be treated by the data repository service 110 as an atomic unit such that data consumers 106 may not see part of the dataset without the rest. For example, a transaction may be used to upload a dataset that includes 10 million hit records for a particular website. In this case, the data repository service may be configured to make available all the 10 million hit records to data consumers or none at all. In some embodiments, a transaction may include one or more batches of data upload. For example, a transaction of 10 million hit records may include 10 batches of 1 million records each. If any of the batches fail to upload successfully, the data repository service 110 ensures none of the data from the failed transaction is visible to a data consumer 106. In various embodiments, a repository service 110 may run one or more transactions sequentially or in parallel.

In various embodiments, data producers 104 and data consumers 106 may be connected to data repository service 110 via a network such as the Internet, local area network ("LAN"), wide area network ("WAN"), wireless data network or any other data network.

Figure 2:
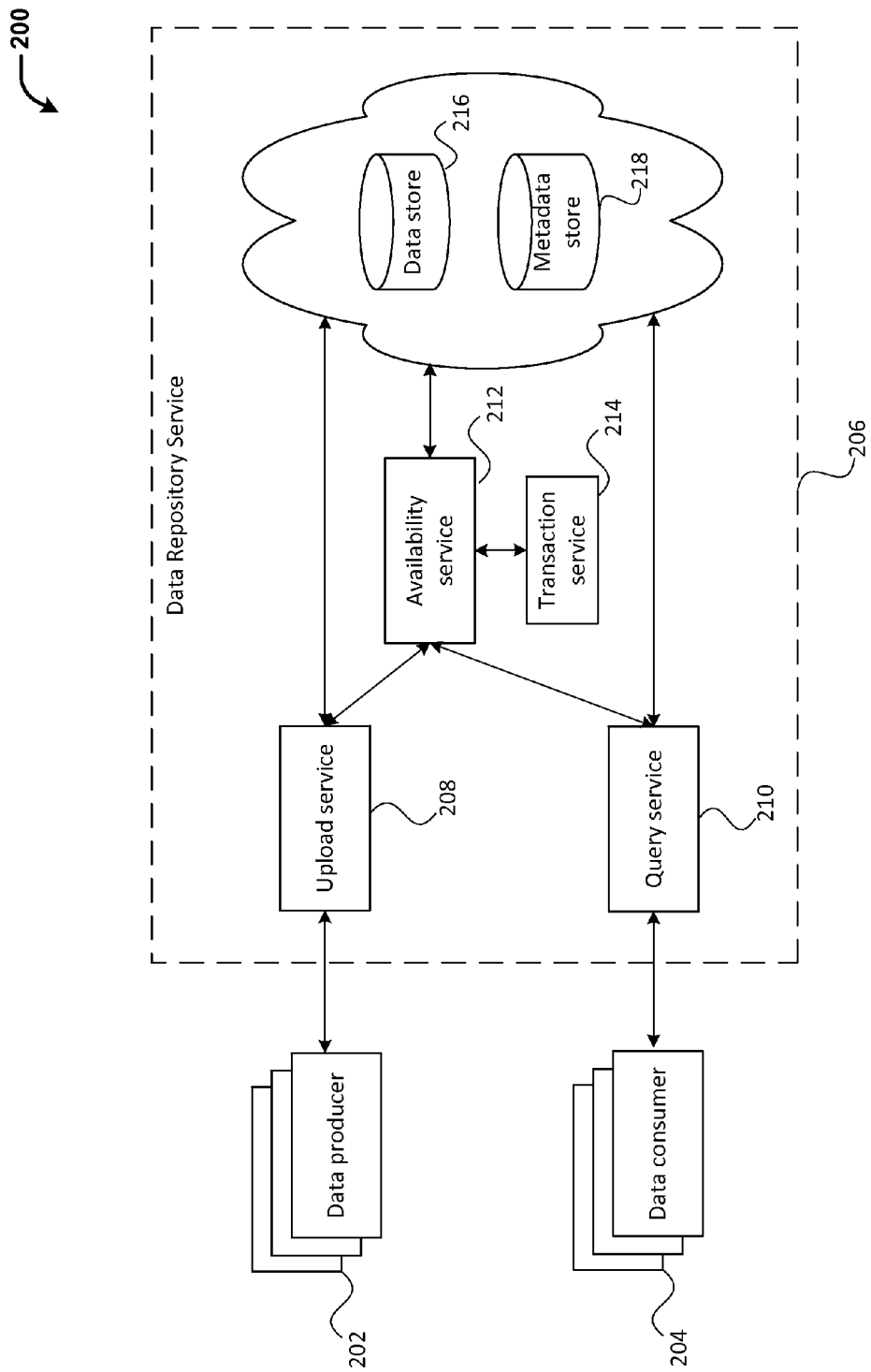
FIG. 2 illustrates an example environment for implementing a data repository service, in accordance with at least one embodiment.

FIG. 2 illustrates an example environment 200 for implementing a data repository service, in accordance with at least one embodiment. FIG. 2 is similar to FIG. 1 but shows components of the data repository service in more detail. In this example, one or more data producers 202 and one or more data consumers 204 are operably connected with a data repository service 206. The data producers 202, data consumers 204 and the data repository service 206 are similar to data producers 104, data consumers 106 and the data repository service 110 discussed in connection with FIG. 1.

In some embodiments, data repository service 206 comprises multiple subsystems, components or services that each provides a particular set of functionalities. Each subsystem or component may comprise one or more sub-components that collectively provide the particular set of functionalities. Each component or subcomponent may be implemented by one or more physical and/or logical computing devices, such as computers, data storage devices and the like. Each subsystem or component of the data repository service 206 may communicate with other subsystems or components or with external entities such as customers. At least some of such interactions are indicated by arrows in FIG. 2. Such communications may take place over a network such as described above or via any suitable communication technologies. It will be appreciated by those of ordinary skill in the art that various embodiments may have fewer or a greater number of systems, subsystems and/or components than are illustrated in FIG. 2. Thus, the depiction of environment 200 in FIG. 2 should be taken as being illustrative in nature and not limiting to the scope of the disclosure.

In the illustrated example, the data repository service 206 includes an upload service 208 that provides an application programming interface ("API") to enable data producers 202 to programmatically interface with the various features, components and capabilities of the data repository service 206. Such APIs may be part of a user interface that may include graphical user interfaces (GUIs), Web-based interfaces, programmatic interfaces such as application programming interfaces (APIs) and/or sets of remote procedure calls (RPCs) corresponding to interface elements, messaging interfaces in which the interface elements correspond to messages of a communication protocol, and/or suitable combinations thereof. Capabilities provided by the data repository service 206 to the data producers 202 may include data upload, data modification, data deletion, metadata operations, configuration of various operational parameters and the like. In addition, the upload service 208 may also perform authentication, access control, accouting, metering, billing, logging and similar functionalities. In some embodiments, upload service 208 may encode (e.g., encrypt) or otherwise process uploaded data and/or save the uploaded data in a temporary data store such as a local file system before uploading the data into a remote data store 216.

A data producer 202 may request the performance of any of the above operations by sending API requests to the data repository service 206. Similarly, the data repository service 206 may provide responses to customer requests. Such requests and responses may be submitted over any suitable communications protocol, such as Hypertext Transfer Protocol ("HTTP"), File Transfer Protocol ("FTP") and the like, in any suitable format, such as REpresentational State Transfer ("REST"), Simple Object Access Protocol ("SOAP"), BitTorrent and the like. In some embodiments, the requests and responses may be encoded (e.g., encrypted) and/or provided over a secure channel (e.g., Secure Shell (SSH), Internet Protocol Security (IPsec)).

Similarly, in the illustrated example the data repository service 206 includes a query service 210 that provides an API to enable data consumers 204 to programmatically interface with the various features, components and capabilities of the data repository service 206. The API provided by the query service 210 may be similar to the API provided by the upload service 208 discussed above. Capabilities exposed by the query service API may include data querying, metadata operations, configuration of various operational parameters and the like. In addition, the query service 210 may also perform authentication, authorization, accouting, metering, billing, logging and similar functionalities. In some embodiments, the query service 210 may process (e.g., decrypt, compress/decompress) retrieved data before providing the data to data consumers 204. In some embodiments, data consumers 204 may communicate with query service 210 in a fashion similar to the communications between data producers 202 and the upload service 208.

In the illustrated example, the data repository service 206 includes an availability service 212 that may provide back-end processing for the upload service 208 and query service 210. In particular, availability service 212 may communicate with data store 216 and/or metadata store 218 to facilitate transaction-based data upload and retrieval, as will be described in more detail below. Availability service 212 may also communicate with transaction service 214, which may provide functionalities such as lock management to facilitate concurrency control of transactions, for example.

In the illustrated example, the data repository service 206 may include one or more data stores 216 for storing data uploaded by the data producers 202 and one or more metadata stores 218 for storing metadata related to the uploaded data. Data store 216 and metadata store 218 may be implemented by any data storage system and data storage services that may support data operations such as data insertion, deletion, query and the like. Examples of data stores 216 and metadata stores 218 may include local or remote, relationational or nonrelational databases, data stores or data storage services, local, remote and/or distributed file systems (such as Hadoop Distributed File System (HDFS)), in-memory storage and the like. In some embodiments, data store 216 is implemented by a durable, high-efficiency and low latency data storage service whereas metadata store 218 may be implemented by a less expensive but highly-available and flexible data storage service. In some other embodiments, data store 216 and metadata store 218 may be implemented by the same data store or the same type of data stores.

In some embodiments, metadata stored in the metadata store 218 may be updated or otherwise managed (e.g., by the availability service 212) in connection with data uploaded to the data store 216 to provide ACID-like transactional support. For example, in an embodiment, a data producer may upload data to the data store 216 in multiple batches. For each of the batches uploaded, corresponding metadata may be crated in the metadata store 218. Such metadata may include attributes such as the location of the batch upload in the data store 216, the state of the batch, identifiers of the transaction and the like. In particular, the attribute for the state of the batch may be updated to provide transaction-related features to the data repository service 206, such as atomicity and consistency.

In some embodiments, metadata stored in the metadata store 218 may be used (e.g., by the availability service 212) to determine, based on an isolation level associated with a given, data to retrieve from the data store 216 for the query. For example, the isolation level may be associated with one or more predetermined state values for the batch state attribute described above. Based on the isolation level, batch records with those state values may be identified and the location attribute of the identified batch records may be used to fetch data from the data store 216.

In some embodiments, upload service 208 may communicate directly with the data store 216 to upload data using APIs provided by the data store 216. Likewise, query service 210 may communicate directly with the data store 216 and/or the metadata store 218 to query and retrieve data. In other embodiments, availability service 212 may be the only component accessing and/or updating the metadata store 218.

Figure 3:
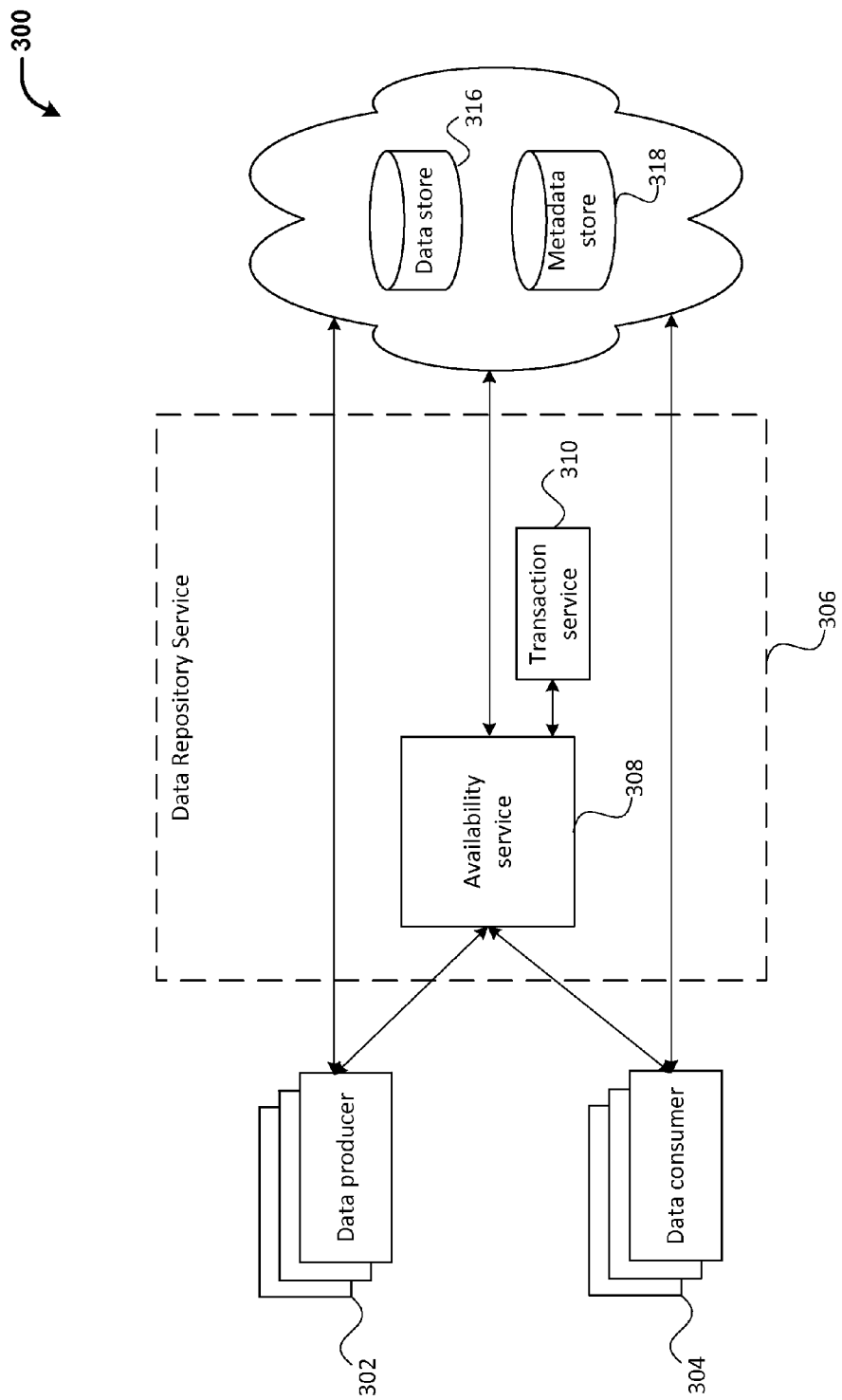
FIG. 3 illustrates another example environment for implementing a data repository service, in accordance with at least one embodiment.

FIG. 3 illustrates another example environment 300 for implementing a data repository service, in accordance with at least one embodiment. FIG. 3 is similar to FIG. 2 except for different configuration of components. In this example, data producers 302 and data consumers 304 (similar to the data producers 202 and data consumers 204 respectively discussed in connection with FIG. 2) communicate directly with availability service 308 which may provide functionalities similar to the upload service 208, query service 210 and availability service 212 discussed in connection with FIG. 2. For example, the availability service 308 may provide APIs for uploading and querying data as well as performing authentication, access control, accounting, data encryption/decryption and other functionalities. Availability service 308 may communicate with transaction service 310, which may provide similar functionalities as the transaction service 214 discussed in connection with FIG. 2.

In various embodiments, any of the components illustrated in FIG. 2 may be operated by the same or a different service provider than the service provider that provides the data repository service. For example, as shown in FIG. 3, data store 316 and metadata store 318 may be operated by a different service provider. The data producers 302 and data consumers 304 may communicate directly with data store 316 and/or metadata store 318, for example, using provided APIs.

Various types of transactions may be supported by the data repository service described herein. For example, a "mutex" transaction may be associated with only one owner (e.g., a process) at any given time. The ownership of a mutex transaction by one process excludes all other processes from running the transaction. A potential owner becomes the temporary owner of a transaction when it begins the transaction (e.g., by acquiring an exclusive lock). Only the temporary owner can release (commit or rollback) the transaction, and no other potential owner can take ownership until the release occurs (e.g., by the release of the exclusive lock). In some embodiments, the transaction may be released by the failure to extend the transaction. A transaction may be extended by extending the expiration of the lock (e.g., to 2 minutes from the current time). During a commit of a mutex transaction, the owner's data becomes visible to queries, masking all previously committed hot data for the same transaction. Data may be considered hot when it can be rolled back, for example, for a short period after it is uploaded. As such, only the latest owner's commit is visible at a time. From a data consumer's point of view, a commit by an owner overwrites the data of any previous commit by prior owners. As an example, a data producer may want to upload many files, each of the file independent and possibly parallel to the others. When a single file upload fails, the data producer may want to re-upload that same file, with the semantics that the new upload "overwrites" the old upload. To this end, the data producer may make each file upload be a mutex transaction with the transaction path equal to the file path.

While a mutex transaction is guaranteed to be atomic, it has drawbacks. For example, a long running transaction may tie up system resources (e.g., for lock maintenance) for an extended period of time, during which other processes potentially more suitable to perform the transaction are excluded from performing the transaction. If a transaction fails for some reason, it must be re-executed all over again resulting in much delay and/or lower throughput. To optimize the performance of transactions, other types of transactions may be supported by a data repository service. For example, a "group" transaction may be used to split up a long transaction into a set of smaller member transactions and all of which may be required to commit the long transaction. In an embodiment, a potential member becomes a member of the group transaction when it begins a member transaction of the group transaction, but only if they have the same group lock key of the group owner. That is, the members of a group transaction all share the same group lock key. All members collectively participate in extending the ownership of the group transaction, and each member is individually responsible for extending its own member transaction. For group transactions, commit is performed at the collection group transaction level, rather than at the individual member transaction level. Thus, the union of all members' data is committed and all members' data is visible at a time.

As an example, a data producer may want to upload multiple files, each of which can be split reliably into many parts. To speed up the upload, each part of a file may be uploaded independently and/or in parallel. If any part fails to upload, only that part of the file needs to be re-uploaded. When all parts of a file are uploaded, all parts of the file should be visible to the queries. In this case, each file load may be a group transaction, with each part upload of the file being a member transaction. When all parts of the file are uploaded, the group transaction may be committed.

Instead of splitting a transaction into a group of smaller transactions, all of which must finish for the transaction to commit, election/candidate transactions allow a transaction to be executed by potentially concurrent processes, some of which may not finish at all. An election transaction may have multiple co-owners, each co-owner may run a candidate election which mirrors the election transaction. In an embodiment, a potential co-owner becomes the first co-owner of an election transaction when it begins a candidate transaction of the election transaction. Another potential co-owner becomes the second, third, etc. co-owner of the election transaction when it begins its own candidate transaction of the election transaction, but only if they have the same election lock key of the first co-owner. That is, the co-owners of an election transaction all share the same election lock key. In some embodiments, each co-owner also has an exclusive candidate lock key associated with each individual candidate transaction. In an embodiment, all co-owners of an election transaction collectively participate in extending the ownership of the election transaction (e.g., extending the election lock key) and each co-owner is individually responsible for extending its own candidate transaction (e.g., extending each candidate lock key).

During a commit of a candidate transaction, the co-owner's candidate data is promoted to the election transaction (that is, it wins the election). The result of this is that one, and only one, of the co-owner's data is the active commit at any point in time. In an embodiment, only the latest co-owner commit is visible at a time. From a data consumer's point of view, a commit by a co-owner appears to overwrite the data of any previous commits by other co-owners, and also overwrites the data of all other previous sets of co-owners.

As an example, a data producer may want to upload multiple files where each file could be duplicated many times by a duplicating, generative process. For example, multiple Hadoop nodes may each be configured to perform the same computation or process the same dataset to optimize performance and/or to provide fault tolerance. Even though a given file may be duplicated many times, it may be desirable to make only one copy of the file visible to queries. In this case, each unique file upload may be an election transaction, with each duplicated file upload being a candidate transaction. Each duplicated file upload can perform its own commit and may share the same election key. The election is not locked exclusive by any one of the candidate transactions except during the beginning and the commit of the transaction. In general, candidate transactions for a given election transaction may performed for a common task such as uploading datasets to add, remove or modify data. For example, an empty dataset may be uploaded in a given election transaction to effectively delete a dataset previously associated with the election transaction.

Figure 4:
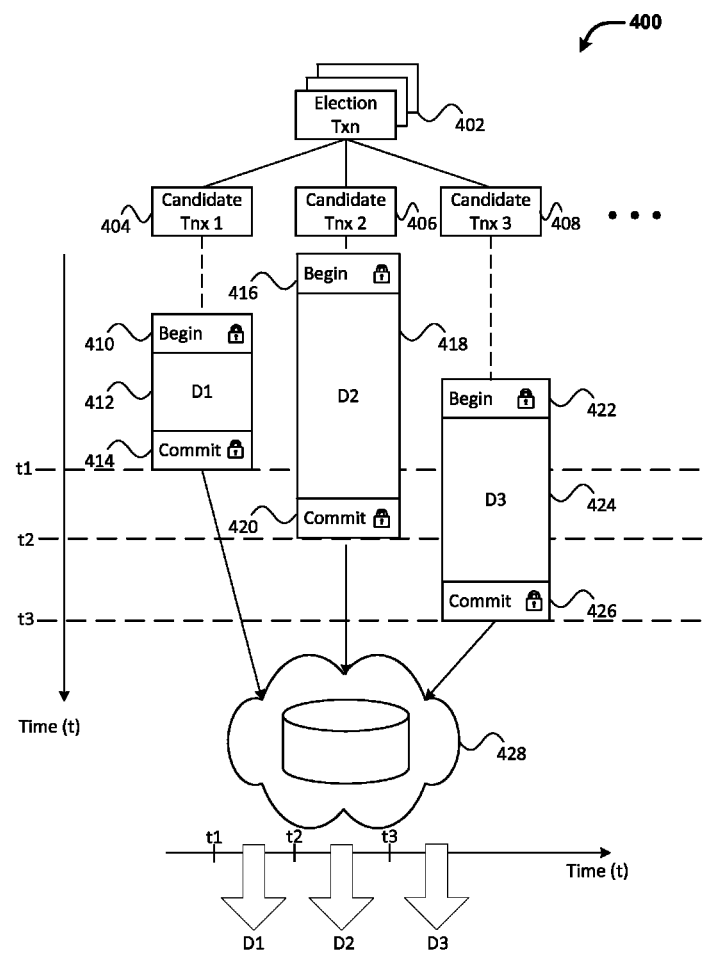
FIG. 4 depicts an example illustration of an election transaction and associated candidate transactions, in accordance with at least one embodiment.

FIG. 4 depicts an example illustration 400 of an election transaction and associated candidate transactions, in accordance with at least one embodiment. In this example, one or more election transactions 402 may each be associated with one or more candidate transactions 404-408. The candidate transactions may be implemented by the same or different computer systems, devices and the like. As discussed above, each candidate transaction may begin at any suitable time. For example, a second candidate transaction may be started if the first transaction is taking too long or after the hardware implementing the first transaction is determined to have failed. However, in an embodiment, only one candidate transaction may begin and/or commit at any given time (depicted pictorially by a lock). When a candidate transaction commits, the candidate transaction gets promoted to become the election transaction and from a data consumer's point of view, the data associated with the candidate transaction overwrites all previously committed candidate transactions for the same election transaction.

In the illustrated example, each of the illustrated candidate transactions uploads its data to a data repository service 428. However, depending on the order of commits of the candidate transactions, different data may be visible to queries to the data repository service 1128. In this example, at time t1, candidate transaction 404 finishes its commit and its data D1 becomes visible to queries to the data repository service 428 regarding election transaction 1102. At time t2 (where t2>t1), candidate transaction 406 finishes its commit and its data D2 becomes the only data visible to queries for election transaction 402. Further, at time t3 (t3<t2), candidate transaction 408 finishes its commit and its data D3 becomes the only data visible to queries for election transaction 402. Thus, between t1 and t2, only D1 is visible, between t2 and t3, only D2 is visible and after t3, only D3 is visible. As illustrated, techniques described herein may be used to provide serializability of candidate transactions.

Figure 5:
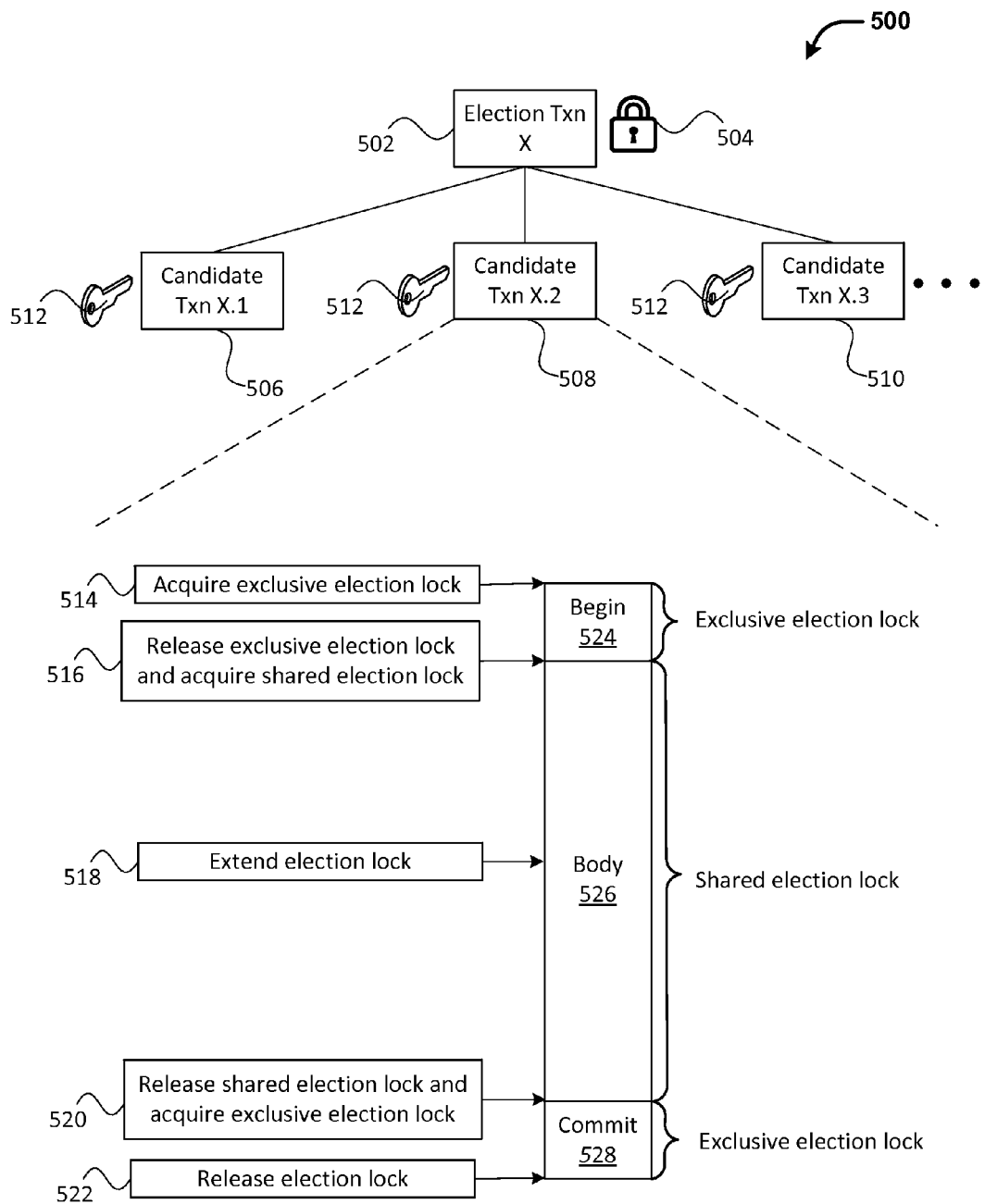
FIG. 5 shows an example illustration of an election transaction and associated candidate transactions, in accordance with at least one embodiment.

FIG. 5 shows another example illustration 500 of an election transaction and associated candidate transactions, in accordance with at least one embodiment. In this example, an election transaction X 502 may be associated with one or more candidate transaction such as candidate transaction X.1 506, candidate transaction X.2 508 and candidate transaction X.3 510. The election transaction X 502 may be associated with an election lock 504 and the lock key 512 for the election lock 504 may be shared by all the candidate transactions as described above. In some embodiments, the election lock 504 may be implemented by a mutex, an exclusive lock that may be acquired or released. In some other embodiments, the election lock 504 may be implemented by an exclusive-shared lock or readers-writer lock which may be acquired by only one process in the exclusive mode and may be shared by multiple processes in the shared mode.

A candidate transaction may begin by acquiring 514 the election lock in exclusive mode. This means that only one candidate transaction may begin at any given time. In some embodiments, the process running a candidate transaction may notify a data repository service of the beginning of the transaction (e.g., by calling the API provided by the service) so that the data repository service may perform appropriate actions such as providing a lock key associated with the requested lock, validating state consistency, cleaning up partial commits, updating metadata and the like before the candidate transaction starts. In some embodiments, the lock key for the election lock may be generated by the data repository service or the process running the candidate transaction. Pictorially, the beginning portion 524 of the candidate transaction is protected by the exclusive election lock such that no other candidate transaction for the same election transaction may begin at the same time. However, assuming a short or brief beginning portion 524, the risk of lock contention may be slight.

Once a candidate transaction is begun, the exclusive election lock may be released 516 and a shared election lock may be acquired 516. In some embodiments, the exclusive election lock may be downgraded (demoted) to a shared lock. As such, once a candidate transaction is begun, other candidate transactions are no longer excluded from beginning. In other words, multiple candidate transactions for the same election transaction may run concurrently and the body portion 526 of each of the candidate transactions is protected only by a shared election lock. In some embodiments, a candidate transaction may include uploading one or more batches of data to a local or remote data store. In some embodiments, locks may expire if not extended or renewed. In such embodiments, the election lock associated with an election transaction may be extended 518 collectively by all or some of the concurrently running candidate transactions, for example, on a regular basis. For example, in an embodiment, the processes running the candidate transactions may periodically send extension requests to the data repository service which may extend the election lock based on such requests. In an embodiment, extension of a lock includes extending the expiration of a lock key associated with the lock.

In some embodiments, once a candidate transaction finishes executing, it may invoke an API provided by a data repository service to commit data associated with the candidate transaction such that the data would become visible to queries by data consumers of the data repository service. In some embodiments, commit of a candidate transaction involves acquiring an exclusive election lock 520. In some embodiments, this may be achieved by causing a shared election lock to be upgraded (or promoted) to an exclusive lock. At any given point in time, only one candidate transaction may commit. In other words, the commit portion 528 of a candidate transaction is protected by the exclusive election lock. If multiple candidate transactions intend to commit at around the same time, one of the candidate transaction may be selected to commit by a data repository service or by the candidate transactions themselves. Various configurable criteria and/or methods may be used to select a candidate transaction. During commit of a candidate transaction, operations may be performed (e.g., by the data repository service) to ensure state consistency, for example, by updating metadata associated with the candidate transaction. If the commit succeeds or if the candidate transaction aborts, the election lock may be released 522 to allow other candidate transactions, if any, to commit. In some embodiments, if the candidate transaction fails to commit for some reason (e.g., due to unavailability of lock), the transaction may be committed at a later time or aborted. As illustrated, exclusive election lock is required only to begin and/or commit portions of a candidate transaction. As such, the risk of lock is likely significantly lower for election transactions than for mutex transactions, where exclusive lock is required to protect the entire transaction. In addition, the election lock key may be shared across many processes, allowing data producers to scale.

Figure 6:
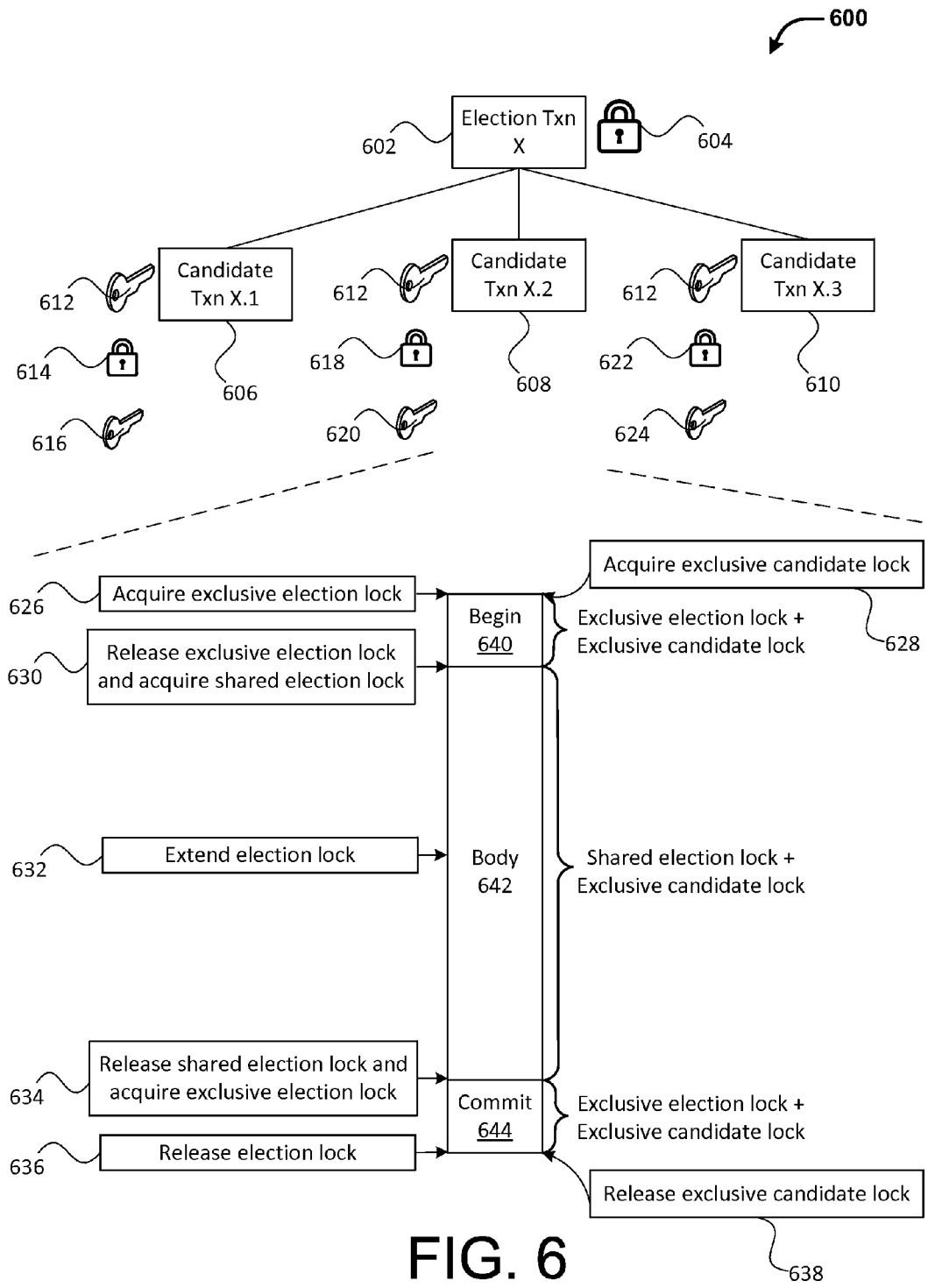
FIG. 6 shows an example illustration of an election transaction and associated candidate transactions, in accordance with at least one embodiment.

FIG. 6 shows another example illustration 600 of an election transaction and associated candidate transactions, in accordance with at least one embodiment. FIG. 6 is similar to FIG. 5 except that each candidate transaction additionally associated with an individual candidate transaction lock. In this example, an election transaction X 602 may be associated with one or more candidate transaction such as candidate transaction X.1 606, candidate transaction X.2 608 and candidate transaction X.3 610. The election transaction X 602 may be associated with an election lock 604 and the lock key 612 may be shared by all the candidate transactions as described in connection with FIG. 5. In addition, each candidate transaction may be associated with a candidate lock and corresponding lock key. For example, candidate transaction X.1, X.2 and X.3 may be associated with candidate locks 614, 618 and 622, respectively. The candidate transaction may acquire the locks by acquiring the corresponding candidate keys 616, 620 and 624, respectively.

As illustrated, the sequence of operations related to the election lock may be similar to that illustrated in FIG. 5. However, in the illustrated embodiment, an exclusive candidate lock may be acquired 628 at the beginning of a candidate transaction and released 638 only at the end of the candidate transaction. In addition, the candidate lock may need to be extended during the transaction. Rather than collectively extending an election lock by a group of concurrent candidate transactions, each candidate transaction may be individually responsible for extension of its own candidate lock. Thus, in the illustrated embodiment, the begin portion 640 of the candidate transaction is protected by both the exclusive election lock and the exclusive candidate lock. The body portion 642 of the candidate transaction is protected by both the shared election lock and the exclusive candidate lock. And finally, the commit portion 644 of the candidate transaction is protected by both the exclusive election lock and the exclusive candidate lock.

It should be appreciated that, for the rest of the discussion, while election/candidate transactions are mostly used as examples to illustrate the techniques described herein, those techniques are also generally applicable to any other types of transactions such as mutex transactions, group transactions and the like.

Figure 7:
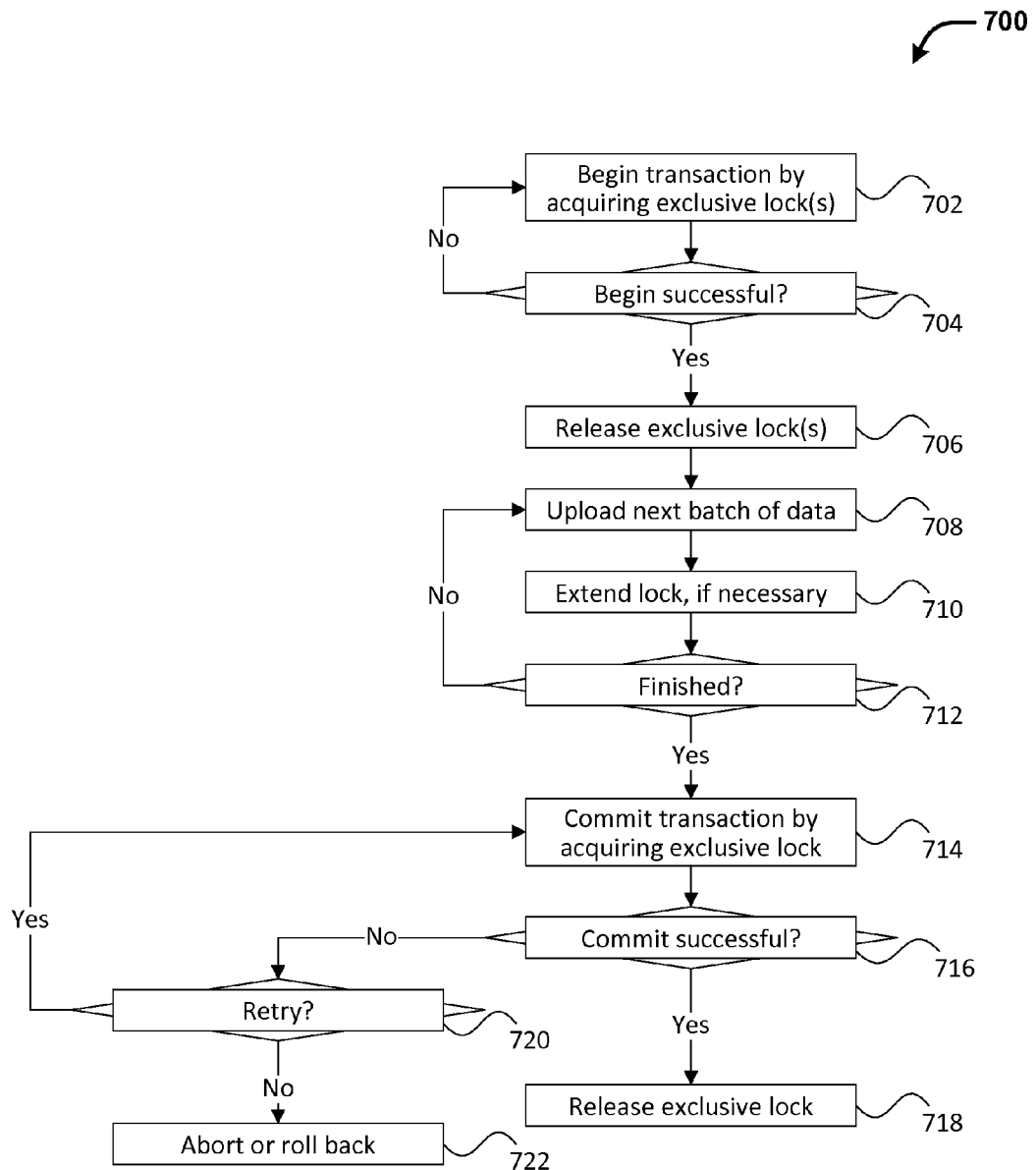
FIG. 7 illustrates an example process for executing a transaction, in accordance with at least one embodiment.

FIG. 7 illustrates an example process 700 for executing a transaction, in accordance with at least one embodiment. Some or all of the process 700 (or any other processes described herein, or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. The order in which the operations are described is not intended to be construed as a limitation, and any number of the described operations can be combined in any order and/or in parallel to implement the processes. In some embodiments, aspects of process 700 may be implemented by one or more data producers and/or upload service described in connection with FIGS. 1, 2 and 3.

In an embodiment, process 700 includes beginning 702 a transaction. The transaction may be a candidate transaction associated with an election transaction. In some embodiments, such a candidate transaction may be used to enhance the throughput or response time associated with the election transaction and/or to provide fault tolerance and redundancy. In other embodiments, candidate transactions may be started to overwrite (from a data consumer's point of view) data written by previous candidate transactions.

In an embodiment, beginning 702 a transaction includes initiating an API request (such as a REST service request) to a data repository service. The request may include an identifier of one or more transactions. For example, the request may include an identifier for an election transaction as well as an identifier of the election transaction. As used herein, a transaction identifier refers to a unique identifier that identifies a transaction. For example, a transaction identifier may include a unique path in a file system (e.g., /2012/11/04), a hash code thereof, a globally unique identifier (GUID) or a combination thereof. In some embodiments, a transaction identifier may identity of the data producer (e.g., IP address, computer name) and/or time of the day. In some embodiments, the transaction identifier may be assigned or generated by the data repository service, a data producer or a third-party entity.

In an embodiment, beginning a transaction includes acquiring one or more exclusive locks. Such exclusive locks may include an election lock and/or a candidate lock such as described above. In some embodiments, acquiring the exclusive lock may include receiving (e.g., from a data repository service or a transaction service) a lock key corresponding to the exclusive lock. As used herein, a lock key may include any unique identifier such as a GUID, a unique alphanumeric string or a hash code thereof. The ownership of a lock key, in some embodiments, may indicate the ownership of an exclusive or shared lock (e.g., election lock, candidate lock). In some embodiments, instead of receiving lock key(s) from a data repository service, process 700 may include generating and/or providing the lock key(s), for example, as part of a request to begin the transaction or a request to acquire lock(s). In response, the provided lock key(s) may become associated with the corresponding lock(s).

In an embodiment, process 700 includes determining 704 whether the request to begin is successful. In some embodiments, various actions may be performed (e.g., by the data repository service) to prepare for the beginning of a transaction, such as updating relevant metadata information and the like, to ensure consistency of data visible to data consumers. In some embodiments, process 700 may include receiving a response that indicates whether exclusive lock or locks are acquired and/or whether such preparatory actions are successfully performed. If it is determined that the transaction is not begun successfully, process 700 may include retrying to begin 702 the transaction after a period time or abort. Otherwise, if it is determined that the transaction is begun successfully, process 700 may include releasing 706 the exclusive lock. In some embodiments, releasing the exclusive election lock may include letting the lock expire without extending it and/or actively request the release of the lock. Further releasing the lock may include downgrading the lock from an exclusive lock to a shared lock. In an embodiment, for a candidate transaction, the election lock may be released (or downgraded or demoted to shared lock) but the candidate lock may not be released until the end of the transaction.

In an embodiment, process 700 includes uploading 708 a batch of data associated with a given transaction (e.g., candidate transaction). For example, the transaction may be configured to compute session information and update ten million hit records with the calculated session information. The ten million updated hit records may be uploaded to a data repository service in ten batches of one million records each. In some embodiments, uploading 708 a batch of data may include initiating a request to an API (such as an upload interface) provided by a data repository service. In some embodiments, process 700 may include receiving a confirmation of whether the upload is successful. If the upload is not successful, process 700 may include re-uploading the same batch of data or abort (and optionally roll back) the transaction.

In an embodiment, process 700 includes extending 710 any acquired lock(s), if necessary. In some embodiments, locks and/or lock keys acquired by transactions may be associated with expiration time, for example, to prevent deadlocks and/or to detect failed transactions. Thus, extension of the locks may be necessary to indicate that the locks are still being used by the transactions that acquired them. In various embodiments, extending 710 a lock may include initiating a request to an API such as provided by a data repository service. Various methods may be used to implement the extension of locks. For example, expiration date associated with an existing lock key may be extend (e.g., to two minutes from the current time) or a new lock key may be generated. In an embodiment, multiple concurrently pending candidate transactions for the same election transaction may participate collectively in the extension of the election lock; whereas each candidate transaction may be responsible for extending its own candidate lock (e.g., by extending the expiration date of the corresponding lock key).

In an embodiment, process 700 includes determining 712 whether the transaction (e.g., a candidate transaction) has finished. If not, process 700 includes proceeding with the rest of the transaction, such as producing and uploading 708 the next batch of data (e.g., to a data repository service). Otherwise, if it is determined that a transaction is finished, process 700 includes committing 714 the transaction, for example, by initiating an API request to a data repository service. The request may include an identifier of the transaction to be committed. In the case of candidate transaction, the request may include an identifier of the election transaction as well as an identifier for the candidate transaction. In some embodiments, the request may also include lock key(s) associated with one or more acquired locks, for example, to demonstrate the ownership of the transaction. For example, the commit request of a candidate transaction may include a candidate lock key and/or an election lock key. The lock keys may be shared or exclusive and may be provided by a data repository service, a data producer or any other entity.

In an embodiment, committing 714 the transaction includes acquiring 718 an exclusive lock (e.g., an exclusive election lock) or obtaining an upgrade from a shared lock to an exclusive lock to perform commit-related operations. For a candidate transaction, an exclusive election lock may be acquired so that only one of candidate transactions associated with an election transaction may commit at any given time. If the exclusive lock cannot be obtained, process 700 may include retrying at a later time or aborting the transaction.

In an embodiment, process 700 includes determining 716 whether the commit is successful. In some embodiments, various actions may be performed (e.g., by the data repository service) as part of a commit of a transaction such as updating relevant metadata information and the like to ensure consistency. In some embodiments, process 700 may include receiving a response to a request to commit a transaction that indicates whether such actions are successfully performed. If it is determined that commit is not successful, process 700 includes determining 720 whether to retry committing. If so, process 700 includes retrying commit after a period of time. Otherwise, if it is determined that commit should not be attempted (e.g., when a threshold number of failures has been reached), process 700 includes aborting or rolling back the transaction, for example, via an API provided by a data repository service. Otherwise, if it is determined that commit is successful, process 700 includes releasing 718 the exclusive lock (e.g., election lock). In some embodiments, releasing the exclusive lock may include letting the lock expire without extending it and/or actively request the release of the lock. Further releasing the lock may include downgrading the lock from an exclusive lock to a shared lock. In an embodiment, both the election lock and the candidate lock may be released after a commit of a candidate transaction.

In various embodiments, metadata is maintained and updated for data associated with a transaction so as to provide ACID-like properties for a transaction. In some embodiments, metadata in a metadata store such as the metadata stores 218 and 318 discussed in connection with FIGS. 2 and 3. In some embodiments, the metadata may include a batch table similar to Table 1, below. Whenever a batch of data associated with a transaction is uploaded into a data repository service, a batch record may be created in the batch table. The batch record may be updated during begin, commit and other operations associated with the transaction to ensure consistency.

TABLE 1 illustrates an example batch table, in accordance with at least one embodiment.

| Batch | Location | State | Transaction | ... |
|---|---|---|---|---|
| a8d3d62 | datarepo.com/datastore/batchowner/location1 | PENDING | 201/89/20120504 | ... |
| 7anvqrl | datarepo.com/datastore/batchowner/location2 | PENDING | 201/89/20120503 | ... |
| ... | ... | ... | ... | ... |

As illustrated in Table 1, each batch record may include a Batch attribute that identifies the batch of data uploaded. The Batch attribute may include a file name, an identifier or any information that may be used to uniquely identify the batch. A batch record may also include a Location attribute that may be used to identify the location where the data batch is stored. For example, the Location attribute may include a file system path, a data object identifier, a Uniform Resource Identifier (URI) and the like. In an embodiment, each batch upload is stored in a unique location. A batch record may also include a State attribute that may be used to indicate the state of a batch. In an embodiment, the value for the State attribute may be one of PENDING, ROLLED_BACK, COMMITTED_CURRENT, COMMITTED_OTHER_PENDING and COMMITTED_PAST. The State attribute of a batch data may change as a transaction changes its state. Detailed discussion of state transition is provided in connection with FIGS. 8 and 9. A batch record may also include a Transaction attribute that may be used to identify a transaction that the batch is associated with. In some embodiments, the State attribute of a batch record may change with every state transition. In an embodiment, the Transaction attribute may be used to identify an election transaction, a candidate transaction or both. In another embodiment, instead of one Transaction attribute, a batch record may have an Election Transaction attribute and a Candidate Transaction attribute to identify respectively the election transaction and candidate transaction associated with a batch.

Figure 8:
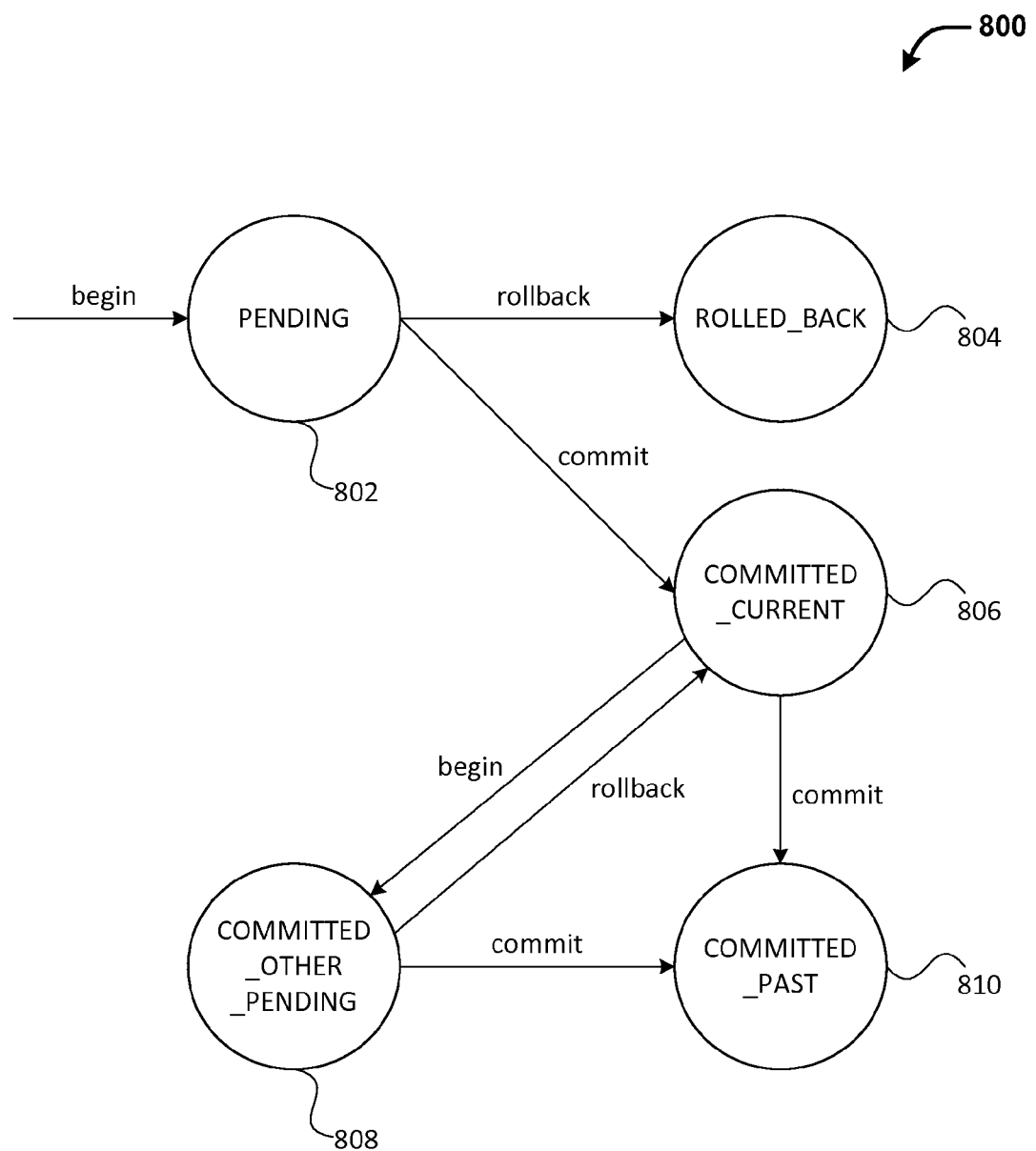
FIG. 8 illustrates an example state transition diagram, in accordance with at least one embodiment.

In various embodiments, more or less attributes than illustrated in Table 1 may be implemented as part of the metadata. For example, in some embodiments, a batch record may also include lastStateChange, preCommitState, commitStartInclusive and commitEndExclusive attributes. The lastStateChange attribute may be used to indicate the time that the most recent state change occurred and may include a timestamp. In some embodiments, the lastStateChange attribute may be updated with a state transition of the batch such as illustrated in FIG. 8. The preCommitState attribute may be used to store the state the batch was in before a commit was performed. In some embodiments, this attribute may be used to undo a partial commit and the value of the attribute and may be one of PENDING, COMMITTED_CURRENT and COMMITTED_OTHER_PENDING. In some embodiments, the preCommitState attribute may be updated at the start of a commit. The commitStartInclusive attribute may be used to indicate the time at which the transaction that introduces the batch is first committed and may include a timestamp. In some embodiments, the commitStartInclusive attribute may change at most once (except for retried partial commits), when state changes from PENDING to COMMITTED_CURRENT. Finally, the commitEndExclusive attribute may be used to indicate the time of the first commit of the transaction after the time indicated by the commitStartInclusive attribute and may include a timestamp. In an embodiment, if there is no subsequent commit, the value of this attribute may be NULL. Thus, in such an embodiment, the commitEndExclusive attribute may only be non-NULL if a transaction is re-committed. In some embodiments, the commitEndExclusive attribute may be updated at most once (except for retried partial commits), when state is transitioned to COMMITTED_PAST.

The metadata described above (e.g., the State attribute) may be used to represent state transitions of a transaction. FIG. 8 illustrates an example state transition diagram 800, in accordance with at least one embodiment. In this example, the circles in the diagram represent the possible states of a transaction. In an embodiment, the states correspond to possible values for the State attribute of a batch record such as described above. The arrows to the circles represents an operation associated with a transaction (e.g., begin, rollback and commit) that lead to the states represented by the circles. For example, if a transaction is begun, its state (and hence the state of the batch records for the transaction) is set to PENDING 802. If the pending transaction subsequently commits, its state changes from PENDING 802 to COMMITTED_CURRENT 806. If the pending transaction is rolled back, its state changes from PENDING to ROLLED_BACK 804. In the case of an election transaction, the state transitions illustrated here may apply to a candidate transaction when another candidate transaction changes state if the two candidate transactions share the same election transaction. For example, if a candidate transaction A has a state COMMITTED_CURRENT 806 and another candidate transaction B for the same election transaction has begun, the state of A is changed from COMMITTED_CURRENT 806 to COMMITTED_OTHER_PENDING 808. Likewise, if B is subsequently rolled back, the state of A is changed from COMMITTED_OTHER_PENDING 808 to COMMITTED_CURRENT 806 whereas the state of B is changed from PENDING 802 to ROLLED_BACK 804. Finally, if a pending candidate transaction commits, any other candidate transactions for the same election transaction with a state of COMMITTED_CURRENT 806 or COMMITTED_OTHER_PENDING 808 changes to COMMITTED_ PAST 810. In some embodiments, the state transitions described herein may be used to provide various isolation levels (e.g., serializability) to transactions.

Figure 9:
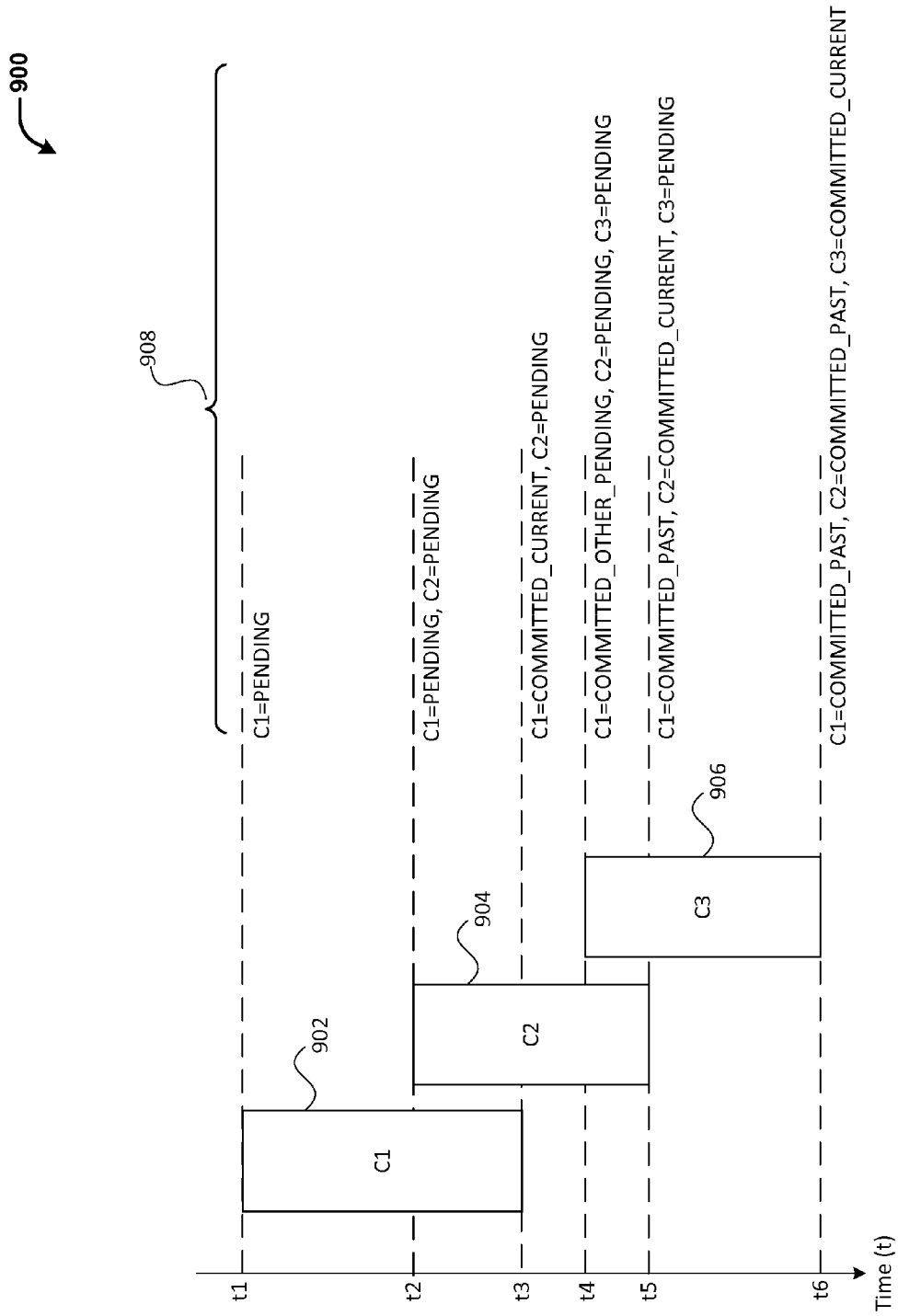
FIG. 9 illustrates an example of state transitions, in accordance with at least one embodiment.

FIG. 9 illustrates an example 900 of the state transitions illustrated in FIG. 8, in accordance with at least one embodiment. In this example, C1 902, C2 904 and C3 906 represent the candidate transactions for a single election transaction. Their states 908 may change according to predefined state transition rules such as illustrated by FIG. 8. At t1, C1 902 begins and the state of C1 is set to PENDING, according FIG. 8. At t2, while C1 is still pending, C2 starts. As a result, the state of C2 is also set to PENDING and the state of C1 is still PENDING. At t3, C1 commits. As a result, the state of C1 is changed from PENDING 802 to COMMITTED_CURRENT 806 according to FIG. 8, while the state of C2 is still PENDING. At t4, C3 starts while C2 is still pending. As a result, the state of C1 is changed from COMMITTED_CURRENT 806 to COMMITTED_OTHER_PENDING 808 according to FIG. 8, while the state for C2 and C3 remain PENDING. At t5, C2 commits. As a result, the state of C1 is changed from COMMITTED_OTHER_PENDING 808 to COMMITTED_PAST 810 and the state of C2 is changed from PENDING 802 to COMMITTED_CURRENT 806, according to FIG. 8, while the state of C3 remains PENDING 802. At t6, C3 commits. As a result, the state of C3 is changed from PENDING 802 to COMMITTED_CURRENT 806 and the state of C2 is changed from COMMITTED_CURRENT 806 to COMMITTED_PAST 810, according to FIG. 8, while C1 remains COMMITTED_PAST 810. As illustrated, in some embodiments, state COMMITTED_CURRENT may be used to indicate the candidate transaction that is currently promoted or elected to be the election transaction. The data associated with such a COMMITTED_CURRENT candidate transaction is considered the latest data visible for queries related to the election transaction.

Figure 10:
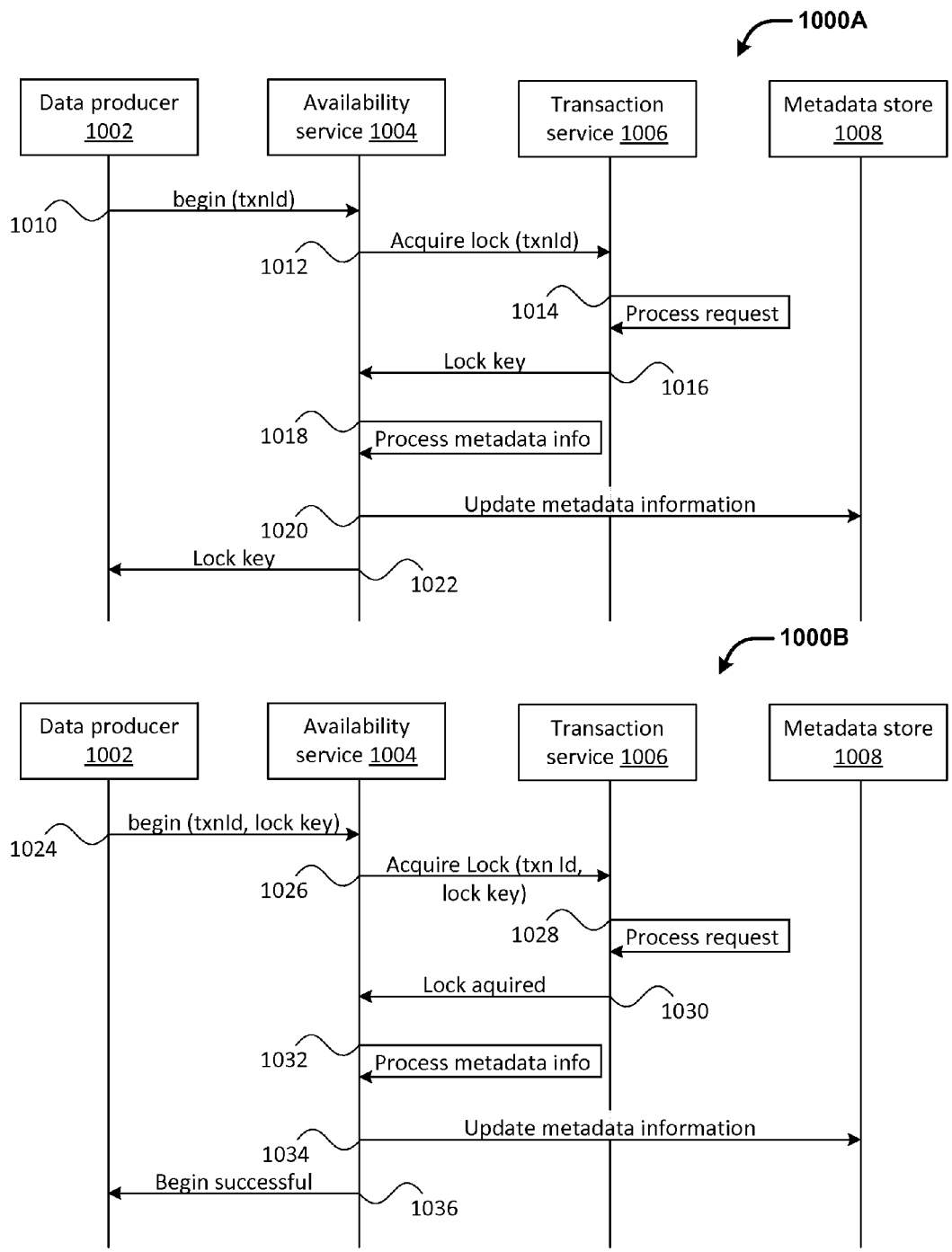
FIG. 10 illustrates an example series of communications for beginning a transaction, in accordance with at least two embodiments.

FIG. 10 illustrates an example series of communications 1000 for beginning a transaction, in accordance with at least two embodiments. In some embodiments, the illustrated series of communications may occur in an environment 300 such as illustrated in FIG. 3, described above. Data producer 1002, availability service 1004, transaction service 1006 and metadata store 1008 may be similar to data producer 302, availability service 308, transaction service 310 and metadata store 318 described in connection with FIG. 3. In other embodiments, the illustrated series of communications may occur in an environment 200 such as illustrated in FIG. 2, described above. In such an embodiment, a upload service (such as upload service 208 described in connection with FIG. 2) instead of data producer 1002 may take the place of data producer 1002 in FIG. 8.

In the illustrated embodiment 1000A, a data producer 1002 initiates a request 410 to begin a transaction, for example, using an API (such as a REST service API) provided by a data repository service. In an illustrative embodiment, the request 410 include an invocation of a method begin with one or more transaction identifiers, txnId, such as described above in connection with FIG. 7. For example, the one or more transaction identifiers may include an identifier associated with a candidate transaction, an election transaction or both. In some embodiments, the transaction identifier may be assigned or generated by the data repository service, the data producer or some third-party entity.

In some embodiments, availability service 1004 may receive the request 1010 directly from a data producer or indirectly, such as via the upload service 208 described in connection with FIG. 2. Upon receiving the request 1010 to begin a transaction, the availability service 1004 communicates with transaction service 1006 to acquire a lock. In some embodiments, a transaction may be executed by multiple processes running on one or more data producers and only one of the processes may begin the transaction at any given time. In other words, at least the beginning portion of the transaction is protected by an exclusive lock, such as in the case of election/candidate transaction. In some embodiments, the rest of the transaction is also protected by the exclusive lock, such as in the case of mutex transactions. In other embodiments, such as in for election/candidate transactions, the rest of the transaction is not protected by the exclusive lock or protected by a lock that is shared by multiple processes.

In the illustrated embodiment 1000A, transaction service 1006 processes 1014 the request to acquire a lock for the given transaction, for example, using one or more transaction identifiers provided by the data producer 1002. In some embodiments, transaction service 1006 may be configured to maintain and track locks associated with transactions and data producers. In some embodiments, transaction service 1006 may generate and/or maintain a lock key for each lock that is distributed such that the ownership of the lock may be verified by comparing the lock keys. In some embodiments, some or all of the lock related information may be encoded (e.g., encrypted, hashed). For example, transaction service 1006 may maintain the following Table 2 to keep track of locking information.

TABLE 2 illustrates an example locking information table, in accordance with at least one embodiment.

| Transaction Id | Lock key | Shared/exclusive | Expiration | Data producer |
| --- | --- | --- | --- | --- |
| /2012/11/05 | g9mneh9rtitasacc | Exclusive | Nov. 05, 2012 10:32:00 PST | DP 1 |
| /2012/11 | 5wq8f8duz60y7u42 | Shared | Nov. 04, 2012 21:29:30 PST | DP 2 |

In some embodiments, each time a lock is distributed for a transaction, transaction service 1006 may insert a record into a table such as Table 2. The record may include the transaction Id for the transaction for which the lock is acquired, the lock key for the transaction, an indication of whether the lock is exclusive (i.e., only one process may have the lock at any given time) or shared, expiration time of the lock (e.g., 2 minutes from the current time), the entity or entities that currently hold the lock and the like. In various embodiments, the transaction service 1006 may maintain more or less information than illustrated here. For example, the locking information may include whether a lock is associated with an election transaction or a candidate transaction and the identifiers thereof.

In some embodiments, in response to a request to acquire a lock for a given transaction, the transaction service 1006 may look up locking information such as illustrated in Table 2 to determine whether a lock may be acquired for the transaction. In an embodiment, if the requested lock is an exclusive lock and if the lock has not been acquired by any process for the transaction or if the lock has expired, the requested lock may be provided, for example, by generating a new lock key or looking up an existing one from a table similar to Table 2. In another embodiment, multiple processes (e.g., data producers) may share the same lock key for a shared lock (e.g., election lock). In some embodiments, if the lock cannot be acquired, attempt may be made to acquire the lock again after a period of time and/or an error message may be provided to the requester of the lock.

In the illustrated embodiment 1000A, transaction service 1006 provides the lock key(s) 1016 corresponding to the requested lock(s) to availability service 1004 which may in turn provide the lock key(s) 1022 to the data producer 1002. For example, for a candidate transaction, the lock keys provided may include an election lock key and a candidate lock key. The lock keys may be generated from scratch (e.g., when the requester is the first to request the lock) or retrieved from locking information such as illustrated in Table 2 above. In some embodiments, additional information such as the connection information of a data store may also be provided to the data producer so that the data producer may upload data to the data store. In some embodiments, before passing the lock key back to the data producer, the availability service 1004 may also process 1018 metadata information associated with any existing batches of data to ensure consistency of the data repository. For example, the availability service 1004 may clean up any previous partial commits, if any and/or perform rollback operations. To this end, the availability service 1004 may communicate with the metadata store 1008 to update 1020 metadata information associated with existing uploaded data, if any. In some embodiments, such as in the case of election/candidate transactions, an exclusive lock may be downgraded to a shared lock before the shared lock key is provided to a data producer. After receiving the lock key(s) 1022, the data producer 1002 may store the lock key(s) and may subsequently use the lock key(s) 822 to perform other transaction-related operations, such as commit, lock extension, rollback and the like.

In the illustrated embodiment 1000B, the lock key is provided by the data producer 1002, for example, in the initial request 1024 to begin the transaction. In such an embodiment, the availability service 1004 may pass 1026 the lock key to the transaction service 1006, which may grant or reject the request based on locking information such as illustrated in Table 2. The locking information may be updated to reflect the association of the lock key with the requested transaction, for example, after the lock key has been verified to be usable as a lock key for the transaction. Upon the successful acquisition of the lock, the availability service 1004 may process 1032 metadata information and/or update 1034 metadata information similar to the metadata processing 1018 and update 1020 discussed in connection with the illustrated embodiment 1000A. Finally, the availability service 1004 may provide a response 1036 to the data producer that indicates that the begin operation is performed successful. In some embodiments, the availability service 1004 may provide a lock key which may be the same or different than the lock key provided by the data consumer. For example, a different lock key may be provided by the transaction service if the lock key provided by the data consumer is not acceptable for some reason. In other embodiments, the lock key may be provided by a third-party entity other than the data consumer or the data repository service. In some embodiments, the lock key may be a shared lock key (e.g., other data consumers may have the same lock key). In some embodiments, additional information such as the connection information of a data store may also be provided to the data producer.

Figure 11:
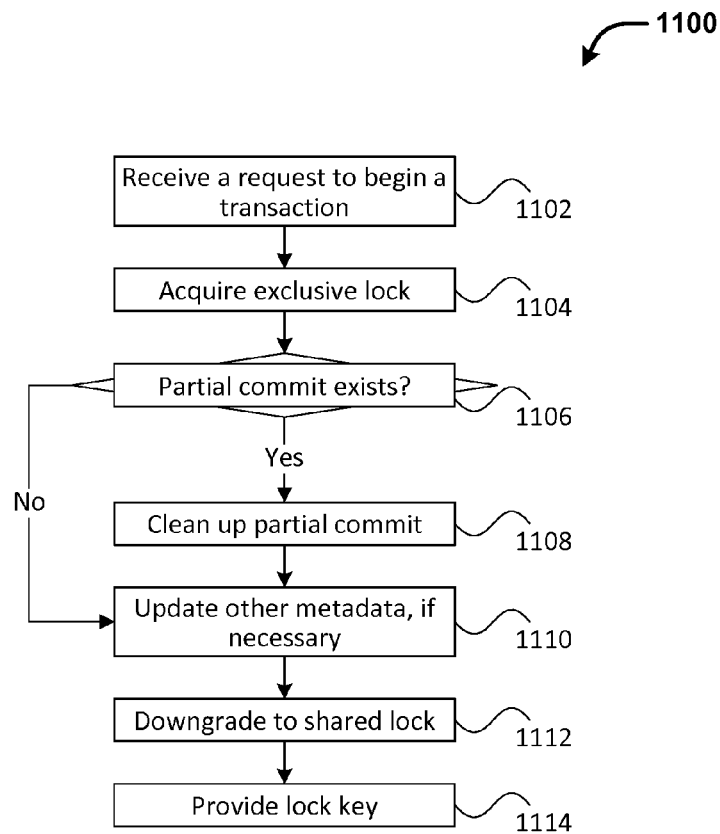
FIG. 11 illustrates an example process for beginning a transaction, in accordance with at least one embodiment.

FIG. 11 illustrates an example process 1100 for beginning a transaction, in accordance with at least one embodiment. In some embodiments, process 1100 may be implemented by one or more components of the data repository services 110, 206 and 306 discussed in connection with FIGS. 1, 2 and 3, respectively.

In an embodiment, process 1100 includes receiving 1102 a request to begin a transaction. Such a request may conform to predefined API and may include a transaction identifier such as described in connection with FIG. 4. In some embodiments, the request may also include a lock key as described in connection with FIG. 4.

In an embodiment, process 1100 includes acquiring 1104 a lock for the transaction, for example, based on currently locking information such as described in connection with Table 2. In some embodiments, locking information may be managed by a global entity (such as the transaction service described in connection with FIGS. 2 and 3) or in a distributed fashion (e.g., locking information may be stored with each data block). In some embodiments, the requested lock may be an exclusive lock. In an embodiment, a lock may be obtained if the transaction is not currently exclusively locked by another process, if the current lock has expired or if the lock is a shared and therefore not exclusive lock. In a typical case, a lock cannot be acquired if the lock is currently acquired exclusively by another process. If a lock cannot be acquired, process 1100 may include waiting for a (configurable) period of time before attempting to acquire the lock again and/or informing the requester of the lock of the failure to acquire the lock. If a lock is determined to have been acquired, in an embodiment, process 1100 may include updating metadata such as described in Table 1, if necessary, to ensure that the data visible to queries are in a consistent state.

In an embodiment, process 1100 includes determining 1108 whether there exists a previous transaction that fails to commit successfully (i.e., a partial commit). In some embodiments, such determination 1108 may be based at least in part on metadata information related uploaded data, such as the metadata associated with batch data, discussed in connection with Table 1. In some embodiments, such determination or validation may be used to verify consistency of a data repository before a transaction is begun, committed and/or rolled back.

In an embodiment, determining whether a partial commit exists involves checking a set of preconditions that must be satisfied based on batch attributes discussed in connection with Table 1. If any of the pre-conditions is not satisfied, a partial commit may be determined to exist. Typically a partial commit exists if batches for the same transaction have inconsistent states. For a given election transaction, metadata for batches associated with each of its candidate transactions may be validated using the pre-conditions. In some embodiments, a first pre-condition may specify that there cannot be batches in PENDING state while at the same time there are batches in COMMITTED_CURRENT state that have lastStateChange=[the last commit time for the transaction]. A second pre-condition may specify that there cannot be batches in COMMITTED_OTHER_PENDING state while at the same time there are batches in COMMITTED_PAST state that have both preCommitState=COMMITTED_OTHER_PENDING and lastStateChange=[the last commit time for the transaction]. Additionally, a third pre-condition may specify that there cannot be batches in COMMITTED_CURRENT state that have lastStateChange=[the last commit time for the transaction] while at the same time there are batches in COMMITTED_CURRENT state that have lastStateChange<[the last commit time for the transaction].

In an embodiment, if a partial commit is determined to exist (such as the failure of one of the pre-conditions above), process 1100 includes cleaning up 1110 the partial commits by updating the metadata associated with the partially committed transactions. For example, using the same set of example pre-conditions described above, if the first pre-condition is violated, batches in COMMITTED_CURRENT state that have lastStateChange=[the last commit time for the transaction] would have their state changed to PENDING and their commitStartInclusive and commitEndExclusive attributes unset. If the second pre-condition is violated, batches in COMMITTED_PAST state that have lastStateChange=[the last commit time for the transaction] and preCommitState=COMMITTED_OTHER_PENDING would have their state changed to COMMITTED_OTHER_PENDING and have their commitEndExclusive attribute unset. Additionally, if the third pre-condition is violated, batches in COMMITTED_CURRENT state that have lastStateChange=[the last commit time for the transaction] would have their state changed to PENDING and their commitStartInclusive and commitEndExclusive attributes unset. In some embodiments, if all or a certain number of the set of pre-conditions are determined to be violated, rollback operations may be performed to restoring the data repository a prior point in time such as before a commit or begin of a transaction.

In an embodiment, process 1100 includes updating 1110 other metadata, if necessary. For example, candidate transactions with COMMITTED_CURRENT may be changed to COMMITTED_OTHER_PENDING, as discussed in connection with FIGS. 8 and 9. In addition, if partial commits cannot be cleaned up, rollback operations may be performed. In an embodiment, rollback operations may be categorized into two phases. The first phase may include changing the state of pending candidate transactions from PENDING to ROLLED_BACK. The second phase of the rollback operations may include change state of previously committed transactions (e.g., candidate transactions for the same election transaction) from COMMITTED_OTHER_PENDING to to COMMITED_CURRENT. In some embodiments, if any of above mentioned metadata operations fail, process 1100 may include providing an error message and/or log.

In an embodiment, process 1100 includes downgrading 1112 an acquired exclusive lock (e.g., election lock) to a shared lock so the corresponding lock key may be shared by other transactions (e.g., candidate transactions for the same election transaction). In an embodiment where both an exclusive election lock and an exclusive candidate lock are acquired for a candidate transaction, the exclusive election lock may be downgraded to a shared lock while the exclusive candidate lock may remain exclusive. For other types of transactions where an exclusive lock to be maintained for the duration of the transaction (such as mutex transactions), the lock may not be downgraded or released.

In an embodiment, process 1100 includes providing 1114 a lock key corresponding to the acquired lock in step 1104 to a data producer. In various embodiments, the lock key may include an identifier or token generated by an entity that manages the locks (e.g., transaction service 214 of FIG. 2), the requester of the lock (e.g., data producer) or any other suitable entity. In some embodiments, process 1100 may also include providing additional information such as the connection information of a data store along with or separately from the lock key. In some embodiments, more than one lock keys may be provided. For example, both a shared election lock key and an exclusive candidate lock key may be provided for a candidate transaction.

Figure 12:
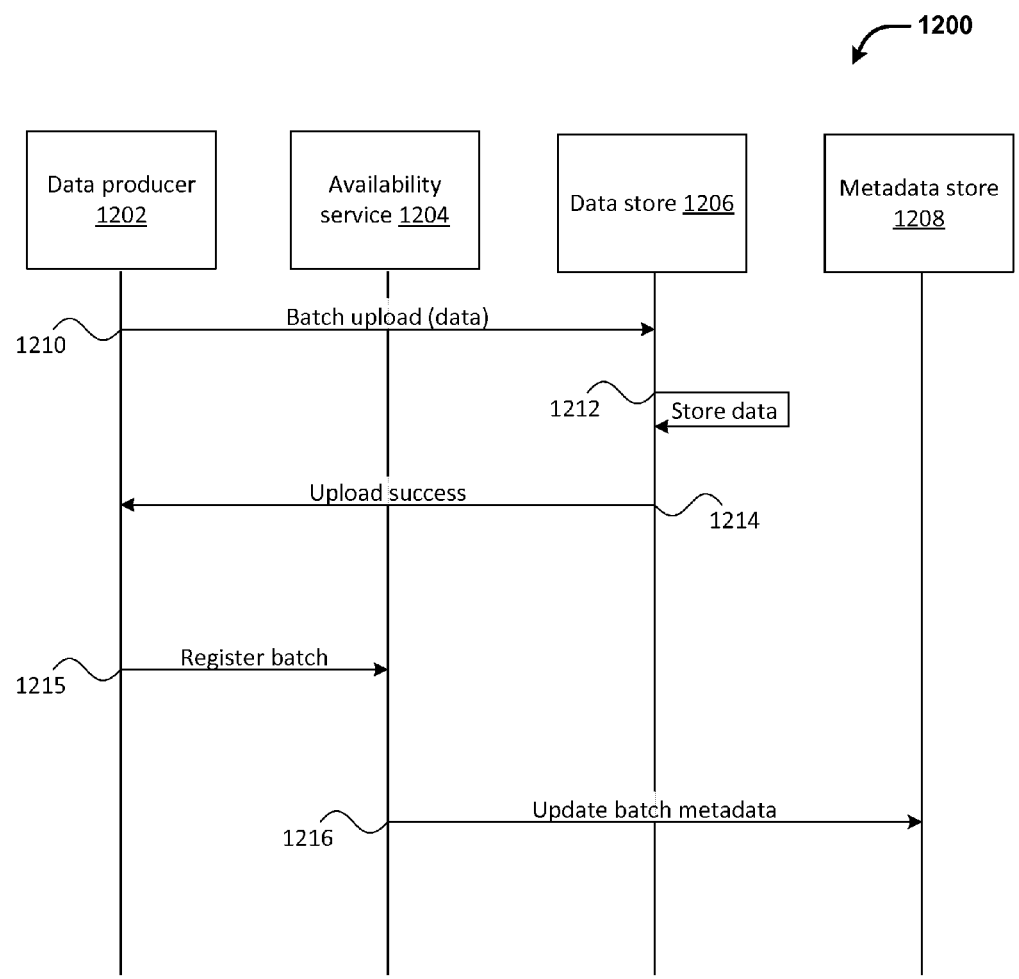
FIG. 12 illustrates an example series of communications for uploading data during a transaction, in accordance with at least one embodiment.

As discussed above, data included in a transaction may be uploaded in one or more batches of data upload. FIG. 12 illustrates an example series of communications for uploading data during a transaction, in accordance with at least one embodiment. In this example, a data producer 1202 may upload one or more batches of data to a data repository. As each batch of data is uploaded, metadata associated with uploaded data may be created and/or updated. In this example, the data producer 1202, availability service 1204, data store 1206 and metadata store 1208 may be similar to the corresponding components in environment 300 described in connection with FIG. 3.

In the illustrated embodiment, after a transaction begins, data producer 1202 may upload 1210 one or more batches of data into data store 1206 using an API provided by the data store 1204. In various embodiments, a data batch may include a subset of the dataset to be uploaded the transaction. For example, a dataset of ten million records may be uploaded in ten batches, where each batch contains one million records. In an embodiment, each batch of data is stored in a file in any suitable format such as plain text, XML, JSON and the like. In some embodiments, the data producer may obtain information related to the data store 1206 such as endpoint information, API information and the like based on configurable information provided by the data producer or a data repository service such as described herein. In some embodiments, rather than uploading directly to the data store 1206, the data producer 1202 may upload the data indirectly via another service such as an upload service or availability service such as described in connection with FIGS. 2 and 3. In some embodiments, data producer 1202 may specify upload parameters such as time, identifier of transactions and the like. Some or all of such upload parameters may be subsequently used as query parameters by data consumers. In some embodiments, the data store 1206 may store 1212 the data in a durable fashion. In other embodiments, data may be stored 1212 in one data store (e.g., a local data store or file system) before being moved to another data store (e.g., a remote data store or file system). In some embodiments, the data may be encoded (e.g., redundantly encoded, encrypted, etc.) before being stored.

After successfully storing 1212 the uploaded batch data, data store 1206 may notify 1214 the data consumer 1202 that the data is stored successfully. In some embodiments, such notification may include information that may be used to locate the stored batch of data such as a file system path, a data object identifier, a Uniform Resource Identifier (URI), credentials and the like. In an embodiment, data producer 1202 notifies the availability service, via an API request 1215, to register the batch. In other embodiments, data store 1206 may notify the availability service 1204 directly to register the uploaded batch.

In response to such a notification, the availability service 1204 may update 1216 metadata information associated with the uploaded data. In some embodiments, metadata may be created and/or updated in a table similar to that illustrated in Table 1 and may include the location of the batch (e.g., a file system path, URI), state (e.g., PENDING), transaction and other information related to the batch and/or transaction.

Figure 13:
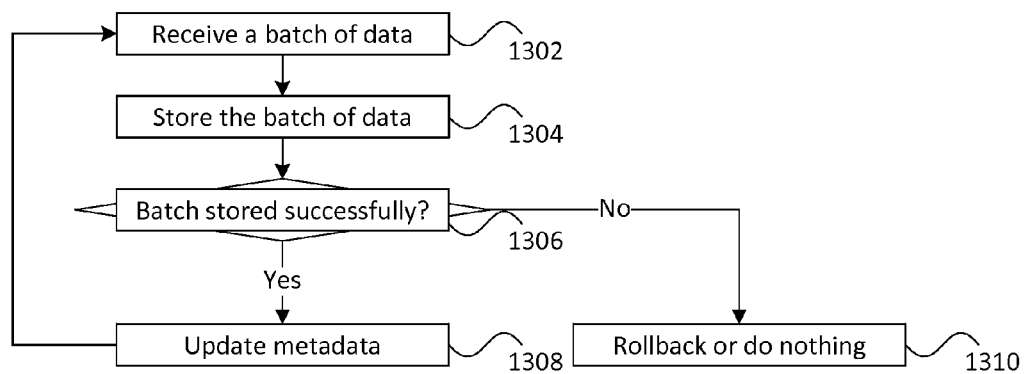
FIG. 13 illustrates an example process for uploading data during a transaction, in accordance with at least one embodiment.

FIG. 13 illustrates an example process 1300 for uploading data during a transaction, in accordance with at least one embodiment. In some embodiments, process 1300 may be implemented by one or more components of the data repository services 110, 206 and 306 discussed in connection with FIGS. 1, 2 and 3, respectively.

In an embodiment, process 1300 includes receiving 1302 a batch of data in connection with a transaction. In some embodiments, the batch of data may be received via an API provided by a data repository service described herein. Upon receiving the batch of data, process 1300 includes storing 1304 the batch of data, for example, in a durable data store such as described in connection with FIGS. 2 and 3. Next, process 1300 includes determining 1306 whether the batch of data is stored successfully. If it is determined that the batch is stored successful, process 1300 includes updating 1308 the metadata associated with the batch. In some embodiments, updating 1308 the metadata may include creating a batch record corresponding to the batch in a batch table similar to Table 1. In some embodiments, if the batch fails to store successfully, process 1300 may include actively rolling back 1310 the transaction by updating the metadata associated with the batches or simply leaving the metadata as is. In an embodiment, if a batch is stored uploaded successfully, process 1300 includes uploading 1302 additional batches of data associated with one or more transactions.

Figure 14:
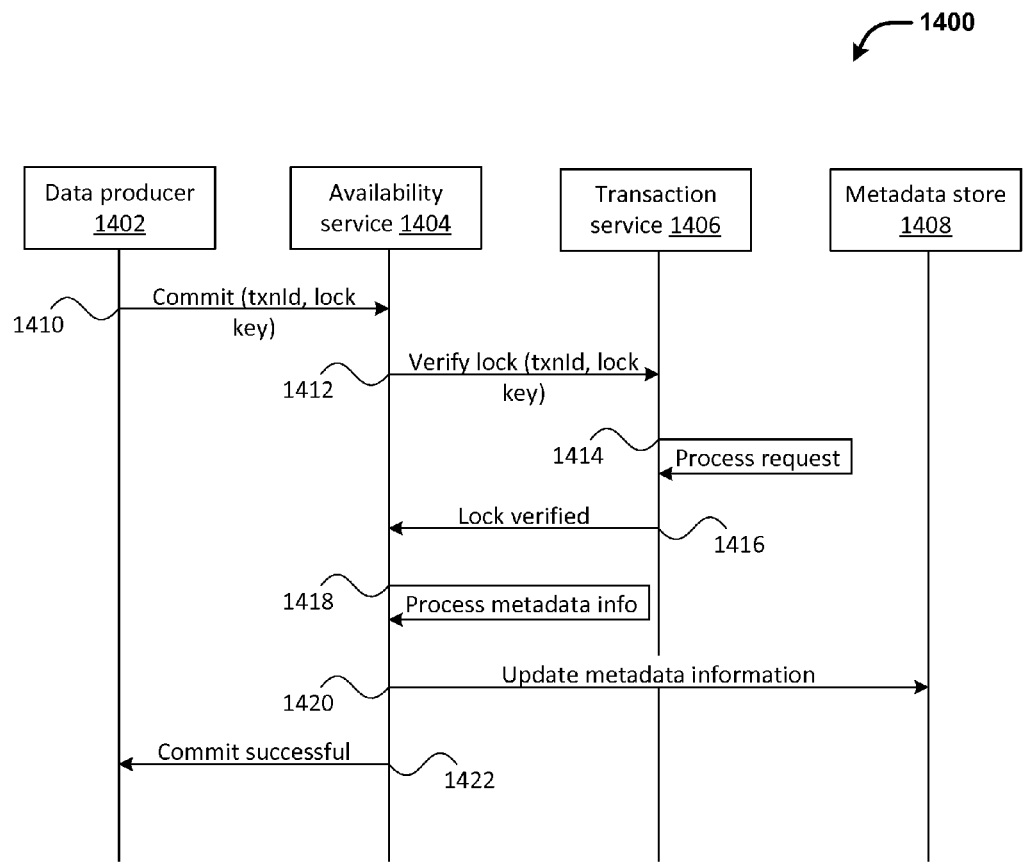
FIG. 14 illustrates an example series of communications for committing a transaction, in accordance with at least one embodiment.

Once a data producer finishes uploading one or more batches of data associated with a transaction, the data producer may commit the transaction to make the uploaded data visible to the data consumers. FIG. 14 illustrates an example series of communications for committing a transaction, in accordance with at least one embodiment. In this example, a data producer 1402 may send a request 1410 to availability service 1404 to commit a transaction. The request may include an identifier of the transaction as well as a lock key that is acquired for the transaction. In the case of election/candidate transactions, the lock key may include a shared election key and an exclusive candidate lock key. As discussed in connection with FIG. 11, each concurrently running candidate transactions for the same election transaction may hold the same shared lock key for the election transaction but exclusive candidate lock key for the particular candidate transaction.

In the illustrated example, the availability service 1404 may communicate with transaction service 1406 to verify 1412 the lock or locks, for example, using an API provided by the transaction service 1406. In response to the verification request, the transaction service 1406 may determine 1414 whether the lock or locks indeed belong to the requester of the commit. For example, the transaction service 1406 may look up a transaction from a table similar to Table 2 using the transaction identifier, and compare the lock key provided by the requester with the lock key associated with the transaction. In some embodiments, the identity of the request (e.g., data producer) may also be used to verify ownership of lock keys. In some embodiments, transaction service 1406 may determine 1414 whether an exclusive lock may be acquired for the commit. In an embodiment, an exclusive lock may be acquired or a shared lock (e.g., shared election lock) may be upgraded or promoted to an exclusive lock (e.g., exclusive election lock) if the lock is not being exclusively used by another process.

The transaction service 1406 may communicate with availability service 1404 with an indication 1416 of whether the lock is verified and/or whether an exclusive lock can to obtained for the commit. In some embodiments, if the lock is unverified, availability service 1404 may provide a response to the data producer 1402 that indicates as such. If an exclusive lock cannot be acquired, availability service 1404 may wait for a (configurable) period of time before retrying and/or informing the data producer 1402 to retry later.

If the lock is verified and the lock is acquired in exclusive mode, the availability service 1404 may proceed with processing 1418 metadata information associated with uploaded batches of data, if any. To that end, the availability service 1404 may communicate with the metadata store 1408 to update metadata information. For example, availability service 1404 may clean up partial commits, if any, similar the cleanup of partial commits performed in association with the beginning of a transaction, discussed above in connection with FIG. 11. As another example, the state of the batches associated with the current transaction, if any, may be changed from PENDING to COMMITTED_CURRENT. After performing the necessary metadata update, availability service 1404 may provide a response 1422 to the data producer 1402 to indicate the success or failure of the commit and/or provide the result in a log.

Figure 15:
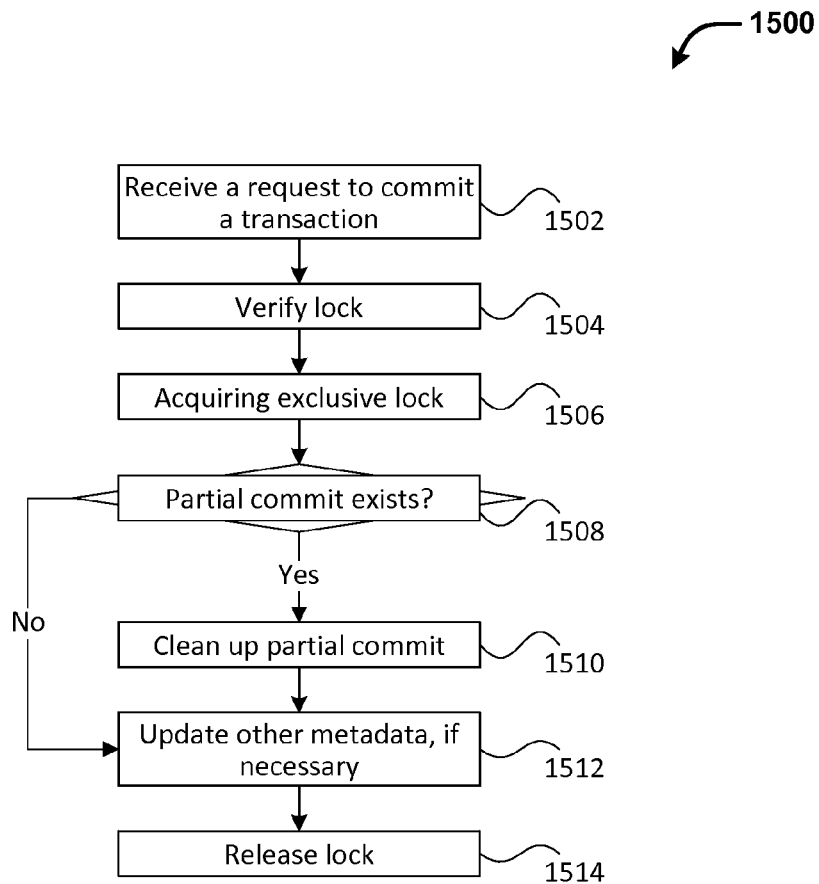
FIG. 15 illustrates an example process for committing a transaction, in accordance with at least one embodiment.

FIG. 15 illustrates an example process 1500 for committing a transaction, in accordance with at least one embodiment. In some embodiments, process 1500 may be implemented by one or more components of the data repository services 110, 206 and 306 discussed in connection with FIGS. 1, 2 and 3, respectively.

In an embodiment, process 1500 includes receiving 1502 a request to commit a transaction, for example, from an API provided by a data repository service. In some embodiments, the request may include a lock key associated with a lock and a transaction identifier such as described in connection with FIG. 14. In some embodiments, more than one lock keys or transaction identifiers may be received. For example, both an election lock key and a transaction lock key may be received. Similarly, both an election transaction identifier and a candidate transaction identifier may be received. In other embodiments, the request may include other information (e.g., identity of the requester) in addition to or instead of the lock key and transaction identifier.

In an embodiment, process 1500 includes verifying 1504 that the requester indeed owns the lock for the transaction, such as by consulting a table similar to Table 2. For example, locking information associated with the transaction identifier(s) may be retrieved and compared with the provided lock key(s) and/or identity of requester.

In an embodiment, process 1500 includes acquiring 1506 an exclusive lock, which may include acquiring a new lock or upgrading an existing lock to an exclusive mode. For example, in some embodiments, a candidate transaction may have shared election lock as well as an exclusive candidate lock. During commit, the shared election lock may be upgraded to become an exclusive lock so that for a given election transaction, only one candidate lock may commit at any given time. If an exclusive lock cannot be acquired (e.g., because some other transaction is already using the lock exclusively), process 1500 may include waiting for a (configurable) period of time before retrying and/or aborting the transaction. In some embodiments, aborted transactions may need to be rolled back, such as described in connection with block 1110 of FIG. 11.

In an embodiment, if the lock or locks are verified and exclusive lock or locks are acquired, process 1500 includes determining 1508 whether there exists a previous transaction that fails to commit successfully (i.e., a partial commit). If it is determined that partial commit exists, process 1500 includes cleaning up 1510 the partial commit. In some embodiments, the detection and cleaning up of partial commits are similar to that discussed in connection with FIG. 11.

Additionally, process 1500 includes performing 1512 other metadata updates, if necessary. Such update may be performed on batch metadata similar to that illustrated by Table 1. In an embodiment where a candidate transaction of an election transaction is to be committed, the metadata of batches for all other candidate transactions for the same election transaction may also be examined to determine whether update is required. In an embodiment, the state of batches for candidate transactions may be changed from COMMITTED_CURRENT to COMMITTED_PAST. Additionally, the state of batches for candidate transactions may be changed from COMMITTED_OTHER_PENDING to COMMITTED_PAST and for these batches, their commitEndExclusive attribute may be set to the current time. Finally, the state of batches for candidate transactions may be changed from PENDING to COMMITTED_CURRENT and for these batches, their commitStartInclusive attribute may be set to the current time.

In an embodiment, process 1500 includes releasing an exclusive lock such as that acquired at the beginning of the commit. For example, process may include releasing an exclusive election lock and/or an exclusive candidate lock. As discussed above, a transaction service such as transaction service 214 and 310 described in connection with FIGS. 2 and 3, respectively, may be configured with tracking the acquisition and releasing of locks. In some embodiments, process 1500 may also providing an indication (e.g., in a response or a log) of whether the commit has succeeded.

While in an illustrative embodiment, committing a transaction involves only metadata manipulation, in another embodiment, committing a transaction may also involve operations on the actual data instead of or in addition to the metadata manipulation described herein. For example, in an embodiment, data associated with a transaction may be uploaded to a first data storage (e.g., a transient or staging data store) while the transaction is pending and moved to a second data store (e.g., a long-term durable data storage) during commit.

Figure 16:
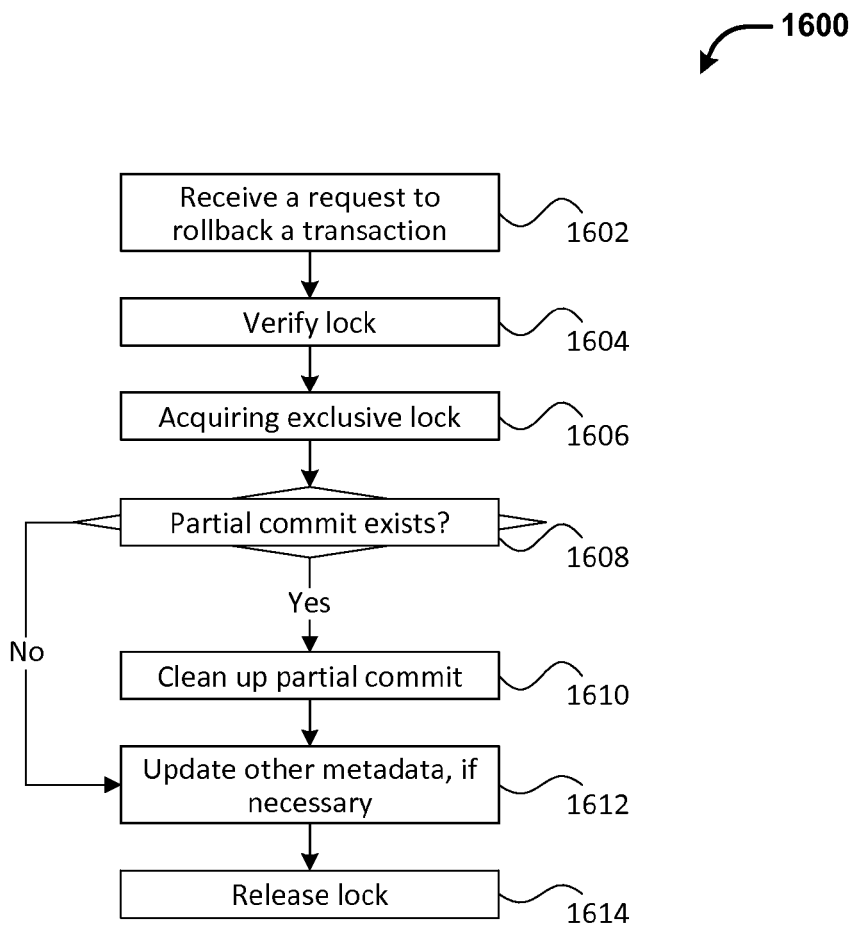
FIG. 16 illustrates an example process for rolling back a transaction, in accordance with at least one embodiment.

FIG. 16 illustrates an example process 1600 for rolling back a transaction, in accordance with at least one embodiment. In some embodiments, process 1600 may be implemented by one or more components of the data repository services 110, 206 and 306 discussed in connection with FIGS. 1, 2 and 3, respectively.

In an embodiment, process 1600 includes receiving 1602 a request to rollback a transaction, for example, from an API provided by a data repository service. In some embodiments, the request may include a lock key associated with a lock and a transaction identifier such as described in connection with FIG. 15. In some embodiments, more than one lock keys or transaction identifiers may be received. For example, both an election lock key and a transaction lock key may be received. Similarly, both an election transaction identifier and a candidate transaction identifier may be received. In other embodiments, the request may include other information (e.g., identity of the requester) in addition to or instead of the lock key and transaction identifier.

In an embodiment, process 1600 includes verifying 1604 that the requester indeed owns the lock(s) for the transaction(s) and acquires an exclusive lock 1606 to ensure consistency of the metadata. In an embodiment, process 1600 includes determining 1608 whether partial commit exists and if so cleaning up 1610 the partial commits. In some embodiments, steps 1604-1610 of FIG. 16 may be performed in a similar fashion as for steps 1504-1510 discussed in connection with FIG. 15.

In an embodiment, process 1600 includes verifying 1604 that the requester indeed owns the lock(s) for the transaction(s) and acquires an exclusive lock 1606 to ensure consistency of the metadata. In an embodiment, process 1600 includes determining 1608 whether partial commit exists and if so cleaning up 1610 the partial commits. In some embodiments, steps 1604-1610 of FIG. 16 may be performed similarly to steps 1504-1510 discussed in connection with FIG. 15.

In an embodiment, process 1600 includes updating 1612 other metadata, if necessary. In an embodiment, rollback operations may be categorized into two phases. The first phase may include changing the state of pending candidate transactions from PENDING to ROLLED_BACK. The second phase of the rollback operations may include change state of previously committed transactions (e.g., candidate transactions for the same election transaction) from COMMITTED_OTHER_PENDING to to COMMITED_CURRENT. In some embodiments, if any of above mentioned metadata operations fail, process 1100 may include providing an error message and/or log. At the end of the metadata operation, the exclusive lock acquired at the beginning of the rollback operation may be release 1614.

Figure 17:
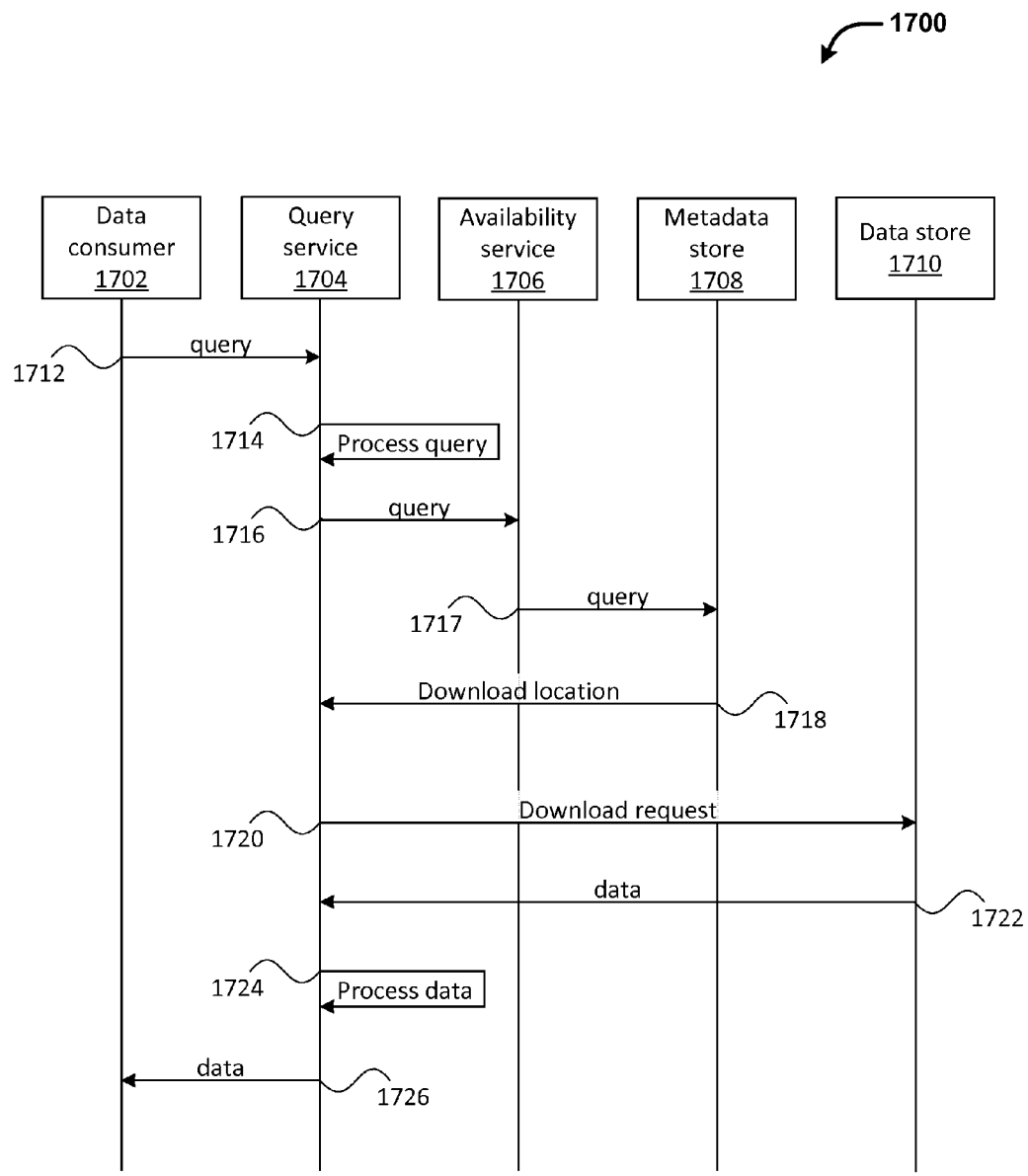
FIG. 17 illustrates an example series of communications for retrieving data, in accordance with at least one embodiment.

FIG. 17 illustrates an example series of communications 1700 for retrieving data, in accordance with at least one embodiment. The illustrated series of communications occur in an environment 200 or 300 described in connection with FIG. 2 or 3 and may be used to retrieve data produced and uploaded by data producers such as described above. In an embodiment, data consumer 1702, query service 1704, availability service 1706, metadata store 1708 and data store 1710 may be similar to the corresponding components in environment 200 shown in FIG. 2 and in environment 300 shown in FIG. 3.

In an embodiment, a data consumer 1702 communicates with a query service 1704 to query data such as that produced by data producers described herein. In some embodiments, the query service 1704 may provide an API (e.g., a REST API) for the data consumer 1702 to perform such queries and to receive queried data. For example, the data consumer 1702 may send a REST request to the query service 1704. The request may include a query according to a schema or syntax of the data repository service. The query service 1704 may process 1714 the request to authenticate the data consumer, enforce access control policies, perform accounting or billing related tasks and the like. In addition, the query service 1704 may transform or translate the query from the data consumer 1702 including query parameters into batch location queries. In one embodiment, the query service 1704 may query 1716 the availability service 1706, which may in turn query 1717 the metadata store 1708 to determine the location of the batch data. In another embodiment, the query service 1704 may query the metadata store 1708 directly.

In some embodiments, the query to the metadata store 1708 includes a transaction identifier and an isolation level. The transaction identified by the transaction identifier may include any type of transactions described herein such as a mutex transaction, an election transaction or a group transaction. In addition, the query may include an isolation level. The isolation level may be specified by the data producer or provided by default (e.g., by the query service). As used herein, an isolation level specifies how visible data produced by concurrent transactions to other transactions or to data consumers. For example, Table 3 illustrates some of the isolation levels supported by a data repository service, in accordance with at least one embodiment. For some isolation levels, such as Repeatable Snapshot Isolated, extra parameters may be provided for the query (e.g., queryTime).

TABLE 3 illustrates example isolation levels and their descriptions, in accordance with at least one embodiment.

| Isolation Level | Description |
| --- | --- |
| Read Uncommitted | Dirty reads are allowed, so during a query not-yet-committed data can be seen. |
| Snapshot Isolated | Snapshot isolation guarantees that all reads made in a transaction will see a consistent snapshot of the data repository. The values that a query will read will be the last committed values that are consistent at the time the query starts. |
| Repeatable Snapshot Isolated | The same as Snapshot Isolated, except the values that a query will read will be the committed values on or before the "queryTime" specified by the consumer. If, for example, the consumer selects the same query time for the same query, the query will always return the same results. |

In an embodiment, Repeatable Snapshot Isolated isolation level is typically used when multiple data consumers query using the same query to read data to ensure that each data consumer receives the same view of the underlying data.

Depending on a specified isolation level, a query to the metadata store may be formulated select the metadata for batches that satisfies the isolation level. Table 4 below illustrates the example isolation levels discussed above and the corresponding query criteria, in accordance with at least one embodiment. The query criteria is expressed in terms of attributes such as those described in connection with Table 1.

TABLE 4 illustrates example isolation levels and corresponding queries, in accordance with at least one embodiment.

| Isolation Level | State Fetched | Extra condition |
| --- | --- | --- |
| Read Uncommitted | PENDING, COMMITTED_CURRENT | |
| Snapshot Isolated | COMMITTED_CURRENT, COMMITTED_OTHER_PENDING | |
| Repeatable Snapshot Isolated | COMMITTED_CURRENT, COMMITTED_OTHER_PENDING, COMMITTED_PAST | [queryTime] >= commitStartInclusive AND ([queryTime] < commitEndExclusive OR commitEndExclusive IS NULL |

Still referring to FIG. 17, upon receiving a query, such as formulated according to Table 4 above, metadata store 1708 may provide a result that includes the locations of batches selected by the query. Such result may be provided to the availability service 1706, the query service 1704 or the data consumer 1702. In the illustrated embodiment, the query service 1704 sends a download request 1720 to data store 1710 to download the batches from received batch locations. The data store 1710 responses with the requested data 1722. In some embodiments, the query service 1704 may further process 1725 the received data before providing the data 1726 to the data consumer. Such processing 1725 may include decrypting data, applying query parameters to filter out irrelevant data and the like. In other embodiments, the query service may provide make the data available at a location for the data consumer to download.

Figure 18:
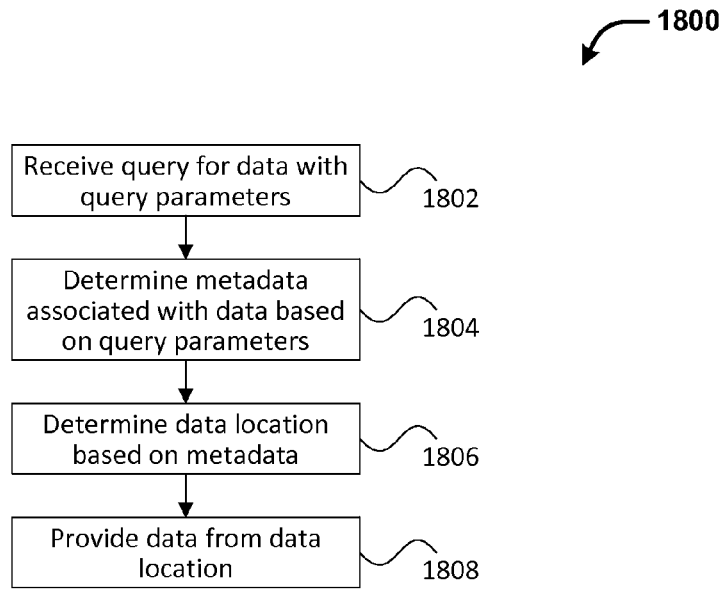
FIG. 18 illustrates an example process for processing a query, in accordance with at least one embodiment.

FIG. 18 illustrates an example process 1800 for processing a query, in accordance with at least one embodiment. In some embodiments, aspects of process 1800 may be implemented by a data repository service described in connection with FIGS. 1, 2 and 3.

In an embodiment, process 1800 includes receiving 1802 a query for data. The data being requested may include data provided by one or more data producers using one or more transactions as described herein. The query may be received via an API (e.g., web service, graphical user interface, command-line tool) provided by a data repository service described herein. In some embodiments, the query may include one or more query parameters such as an isolation level discussed in connection with Table 3, a time condition, identifier of a data producer, an identifier of a transaction or data upload and the like. In some embodiments, the query parameters provided may include some of the upload parameters used by data producers to upload the data.

In an embodiment, process 1800 includes determining 1804 the metadata associated with the data based at least in part on the specified isolation level. For example, the isolation level may be associated with one or more predefined criteria such as illustrated in Table 4. The predefined criteria may be based at least in part on attributes of the metadata (e.g., state) such as illustrated in Table 1. In some embodiments, other criteria may be used to select the metadata such as the identity of the producer and/or consumer of the data, query time, transaction related information and the like.

In an embodiment, process 1800 includes determining 1806 the location where the data is stored based at least in part on the determined metadata. For example, the location of a batch of data may be stored in a Location attribute of the corresponding batch record such as illustrated in Table 1. In an embodiment, the metadata may be used to perform further queries to determine the location of the data. In various embodiments, the data may be stored at any suitable location in a local or remote data store, database, file system, data storage service or the like.

In an embodiment, process 1800 includes providing 1808 the data located at the determined location. In some cases, the data may be processed (e.g., compressed/uncompressed, encrypted/decrypted) before being made available to the requester of the data. Various technologies may be used to "push" the data to the requester of the data or "pull" the data from the storage location.

Figure 19:
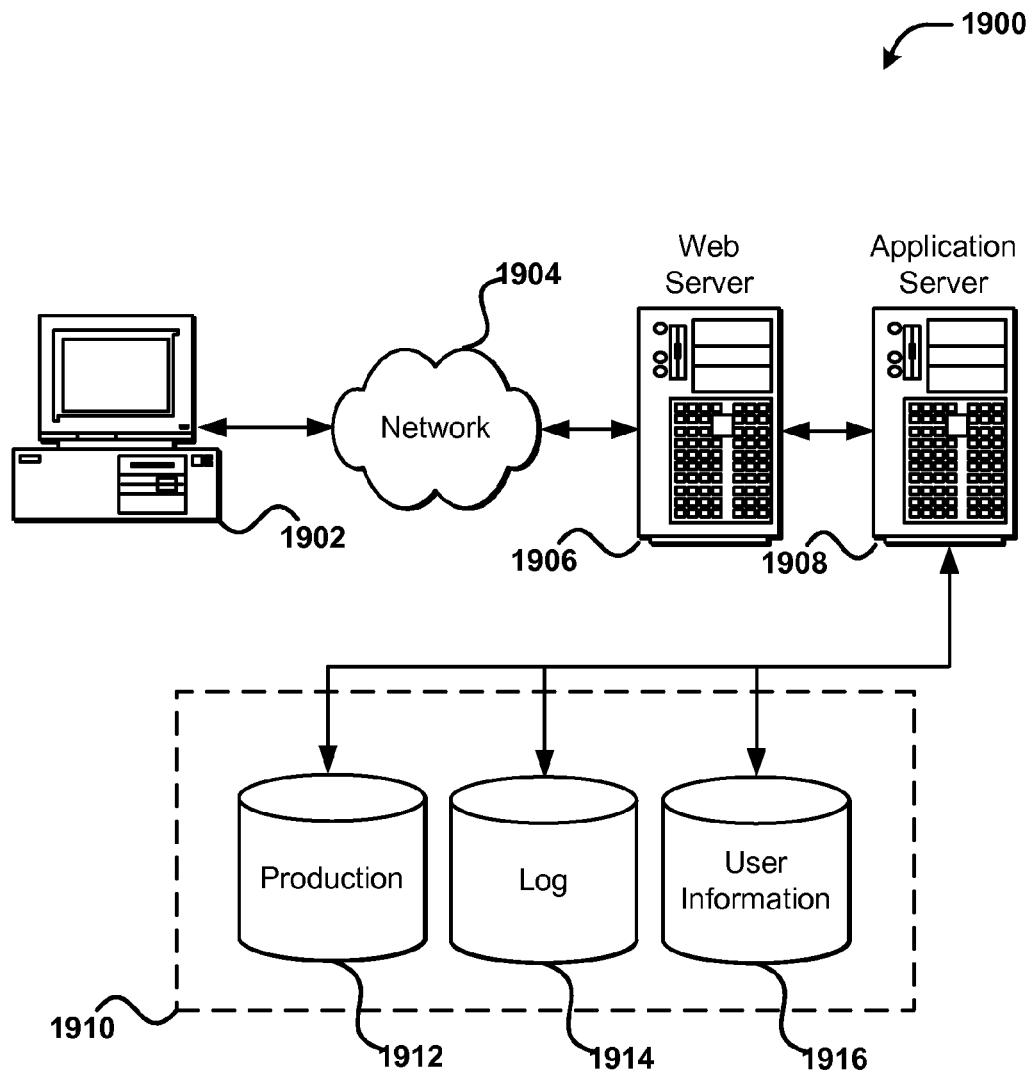
FIG. 19 illustrates an environment in which various embodiments can be implemented.

FIG. 19 illustrates aspects of an example environment 1900 for implementing aspects in accordance with various embodiments. As will be appreciated, although a Web-based environment is used for purposes of explanation, different environments may be used, as appropriate, to implement various embodiments. The environment includes an electronic client device 1902, which can include any appropriate device operable to send and receive requests, messages or information over an appropriate network 1904 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1906 for receiving requests and serving content in response thereto, although for other networks an alternative device serving a similar purpose could be used as would be apparent to one of ordinary skill in the art.

The illustrative environment includes at least one application server 1908 and a data store 1910. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio and/or video to be transferred to the user, which may be served to the user by the Web server in the form of HyperText Markup Language ("HTML"), Extensible Markup Language ("XML") or another appropriate structured language in this example. The handling of all requests and responses, as well as the delivery of content between the client device 1902 and the application server 1908, can be handled by the Web server. It should be understood that the Web and application servers are not required and are merely example components, as structured code discussed herein can be executed on any appropriate device or host machine as discussed elsewhere herein.

The data store 1910 can include several separate data tables, databases or other data storage mechanisms and media for storing data relating to a particular aspect. For example, the data store illustrated includes mechanisms for storing production data 1912 and user information 1916, which can be used to serve content for the production side. The data store also is shown to include a mechanism for storing log data 1914, which can be used for reporting, analysis or other such purposes. It should be understood that there can be many other aspects that may need to be stored in the data store, such as for page image information and to access right information, which can be stored in any of the above listed mechanisms as appropriate or in additional mechanisms in the data store 1910. The data store 1910 is operable, through logic associated therewith, to receive instructions from the application server 1908 and obtain, update or otherwise process data in response thereto. In one example, a user might submit a search request for a certain type of item. In this case, the data store might access the user information to verify the identity of the user, and can access the catalog detail information to obtain information about items of that type. The information then can be returned to the user, such as in a results listing on a Web page that the user is able to view via a browser on the user device 1902. Information for a particular item of interest can be viewed in a dedicated page or window of the browser.

Each server typically will include an operating system that provides executable program instructions for the general administration and operation of that server, and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 19. Thus, the depiction of the system 1900 in FIG. 19 should be taken as being illustrative in nature, and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen or keypad), and at least one output device (e.g., a display device, printer or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method for providing a data repository service, comprising:
   managing, by one or more computer systems, start of a plurality of candidate transactions associated with an election transaction by at least updating metadata associated with at least some of the plurality of candidate transactions to ensure consistency, such that no more than one candidate transaction of the plurality of candidate transactions starts at any given time and at least two candidate transactions of the plurality of candidate transactions are executed at least in part concurrently;
   storing, by the one or more computer systems, a plurality of candidate datasets respectively associated with the plurality of candidate transactions, each candidate dataset of the plurality of candidate datasets being provided in one or more data batches where each data batch of the one or more data batches includes a subset of the candidate dataset;
   for each candidate transaction of the plurality of candidate transactions, maintaining, by the one or more computer systems, the metadata associated with the candidate transaction, the metadata including storage location information and state information for the candidate dataset associated with the candidate transaction;
   managing, by the one or more computer systems, commits of the plurality of candidate transactions by at least updating the metadata associated with at least some of the plurality of candidate transactions to ensure consistency, such that no more than one candidate transaction of the plurality of candidate transactions commits at any given time;
   receiving, by the one or more computer systems, a request for data resulting from the election transaction, the request comprising an isolation level that is associated with a commit state corresponding to the state information of the metadata associated with each candidate transaction;
   selecting, by the one or more computer systems, one or more of the plurality of candidate datasets based at least in part on the isolation level and the metadata associated with one or more of the plurality of candidate transactions corresponding to the one or more of the plurality of candidate datasets; and
   providing, by the one or more computer systems, requested data based at least in part on the one or more selected candidate datasets.

2. The computer-implemented method of claim 1, wherein at least some of the plurality of candidate transactions are each executed by a distinct data producer.

3. The computer-implemented method of claim 2, wherein the data producer includes a Hadoop node.

4. The computer-implemented method of claim 1, wherein the isolation level includes at least one of snapshot isolated, repeatable snapshot isolated or read uncommitted.

5. A computer-implemented method for managing transactions, comprising:
   managing, by a data repository service, a plurality of transactions by at least maintaining metadata associated with at least some of the plurality of transactions to ensure data consistency, wherein the metadata includes storage location information and state information for a dataset associated with the at least some of the plurality of transactions, wherein individual transactions are executed by a computing entity and are related to a common task, and wherein at least some of the plurality of transactions are executed concurrently at least in part, such that no more than one transaction of the plurality of transactions begins at any given time;
   managing, by the data repository service, commits of the plurality of transactions by at least updating the metadata associated with the at least some of the plurality of transactions, such that no more than one transaction of the plurality of transactions commits at any given time;

receiving, by the data repository service, a request for data resulting from the at least some of the plurality of transactions, the request being associated with an isolation level, wherein the isolation level is associated with a commit state corresponding to the state information of the metadata associated with the at least some of the plurality of transactions;

selecting, by the data repository service, the dataset associated with the at least some a subset of the plurality of transactions as data associated with the common task based at least in part on the isolation level and the metadata associated with the at least some of the plurality of transactions; and providing, by the data repository service, the requested data based at least in part on the selected dataset.

6. The computer-implemented method of claim 5, wherein the common task involves uploading data to the data repository service.

7. The computer-implemented method of claim 5, wherein the common task involves removing data from the data repository service.

8. The computer-implemented method of claim 5, wherein execution of an individual transaction includes uploading one or more batches of data to the data repository service.

9. The computer-implemented method of claim 8, wherein the metadata is further associated with each batch of one or more batches of data uploaded in each transaction of the plurality of transactions.

10. The computer-implemented method of claim 9, wherein selecting the dataset associated with a subset of the plurality of transactions comprises determining a location of the one or more batches of data uploaded in each transaction of the subset of the plurality of transactions based at least in part on the metadata associated with the one or more batches.

11. The computer-implemented method of claim 5, wherein the at least some of the plurality of transactions are executed to improve performance characteristics associated with performance of the common task.

12. A computer system for providing a data repository service, comprising:
one or more processors; and
memory, including instructions executable by the one or more processors to cause the computer system to at least:
manage a plurality of election transactions, wherein an individual election transaction of the plurality of election transactions is implemented by a plurality of candidate transactions, wherein the plurality of candidate transactions are executed collectively by a plurality of computing entities, wherein the plurality of election transactions are managed by modifying metadata associated with the plurality of candidate transactions to ensure consistency, and wherein at least two of the plurality of candidate transactions are executed concurrently at least in part;
for individual election transactions of the plurality of election transactions:
store a plurality of candidate datasets respectively associated with the corresponding plurality of candidate transactions, wherein an individual candidate dataset of the plurality of candidate datasets is provided in one or more data batches where an individual data batch of the one or more data batches includes a subset of the candidate dataset; and
allow no more than one of the plurality of candidate transactions to commit at any given time;
maintain the metadata associated with the plurality of candidate datasets associated with the plurality of candidate transactions, wherein the metadata ensures data isolation between the plurality of candidate transactions, and wherein the metadata comprises storage location information and state information for the plurality of candidate datasets;
receive a request for data resulting from the election transaction, the request comprising an isolation level that is associated with a commit state corresponding to the state information of the metadata;
select one or more of the plurality of candidate datasets, based at least in part on the isolation level and the metadata; and
provide the requested data based at least in part on the selected one or more of the plurality of candidate datasets.

13. The computer system of claim 12, wherein the instructions further cause the computer system to provide an application programming interface ("API") for executing at least one of the plurality of election transactions.

14. The computer system of claim 12, wherein the instructions further cause the computer system to provide an API for querying data associated with one election transaction of the plurality of election transactions.

15. The computer system of claim 12, wherein the instructions further cause the computer system to, for each election transaction of the plurality of election transactions, allow no more than one of the plurality of candidate transactions to begin at any given time.

16. The computer system of claim 12, wherein providing the request data includes decrypting at least some of the selected one or more of the plurality of candidate datasets.

17. One or more non-transitory computer-readable storage media having stored thereon executable instructions that, when executed by one or more processors of a computer system, cause the computer system to at least:
manage a plurality of transactions by at least modifying metadata associated with at least some of the plurality of transactions to ensure consistency, wherein an individual transaction is executed to perform a common task, and wherein at least some of the plurality of transactions are executed concurrently at least in part, such that no more than one transaction of the plurality of transactions begins at any given time and no more than one transaction of the plurality of transactions commits at any given time;
manage commits of the plurality of transactions by at least modifying the metadata associated with at least some of the plurality of transactions, such that no more than one transaction of the plurality of transactions commits at any given time;
maintain the metadata associated with the plurality of transactions, the metadata including at least state information and location information; and
in response to a request for data related to the common task and an isolation level, provide the data associated with a subset of the plurality of transactions based at least in part on the metadata and the isolation level, wherein the isolation level is associated with a commit state corresponding to the state information of the metadata.

18. The one or more computer-readable storage media of claim 17, wherein the executable instructions further cause the computer system to store data associated with the plurality of transactions.

19. The one or more computer-readable storage media of claim 17, wherein the state information indicates at least whether a transaction is committed.

20. The one or more computer-readable storage media of claim 17, wherein providing the data associated with the subset of the plurality of transactions includes selecting the metadata based at least in part on the isolation level.

* * * * *